United States Patent
Walker

(10) Patent No.: US 11,076,205 B2
(45) Date of Patent: Jul. 27, 2021

(54) RETRIEVING SUPPLEMENTAL CONTENT

(71) Applicant: COMCAST CABLE COMMUNICATIONS, LLC, Philadelphia, PA (US)

(72) Inventor: Severin Walker, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 14/200,508

(22) Filed: Mar. 7, 2014

(65) Prior Publication Data
US 2015/0256903 A1    Sep. 10, 2015

(51) Int. Cl.
*H04N 21/236* (2011.01)
*H04N 21/435* (2011.01)
(Continued)

(52) U.S. Cl.
CPC ..... *H04N 21/8133* (2013.01); *H04L 65/1089* (2013.01); *H04L 65/4015* (2013.01);
(Continued)

(58) Field of Classification Search
CPC ......... H04N 21/8133; H04N 21/23614; H04N 21/435; H04N 21/4884; H04N 21/84;
(Continued)

(56) References Cited

U.S. PATENT DOCUMENTS

| 4,647,974 A | 3/1987 | Butler et al. |
|---|---|---|
| 5,469,206 A | 11/1995 | Strubbe et al. |

(Continued)

FOREIGN PATENT DOCUMENTS

| DE | 60217091 T2 | 6/2007 |
|---|---|---|
| EP | 0915621 B1 | 5/1999 |

(Continued)

OTHER PUBLICATIONS

Advanced Television Systems Committee, Inc., "ATSC Standard: Programming Metadata Communication Protocol, Revision B," Document A/76B, 52 pages (Jan. 14, 2008).

(Continued)

*Primary Examiner* — Nnenna N Ekpo
(74) *Attorney, Agent, or Firm* — Banner & Witcoff, Ltd.

(57) ABSTRACT

A system may provide supplemental content to a viewer of a content item through use of an embedded identifier indicating an address of associated supplemental content identifying data. The supplemental content identifying data may identify one or more supplemental content items associated with the content item and available to the viewer. An address or other identifier in the supplemental content identifying data may be used to retrieve at least a portion of the available supplemental content items, and a display may be generated combining the content item with the supplemental content. In some embodiments, the identifier may be securely provided to a client and may be authenticated as part of retrieving supplemental content associated with the content item. The identifier may comprise a trusted token or security token used to authenticate the supplemental content identifying data associated with the content item.

29 Claims, 6 Drawing Sheets

(51) Int. Cl.
*H04N 21/431* (2011.01)
*H04N 21/81* (2011.01)
*H04L 29/06* (2006.01)
*H04N 21/488* (2011.01)
*H04N 21/84* (2011.01)
*H04N 21/858* (2011.01)

(52) U.S. Cl.
CPC ...... *H04L 65/4084* (2013.01); *H04L 65/4092* (2013.01); *H04N 21/23614* (2013.01); *H04N 21/435* (2013.01); *H04N 21/4884* (2013.01); *H04N 21/84* (2013.01); *H04N 21/858* (2013.01)

(58) Field of Classification Search
CPC .............. H04N 21/858; H04L 65/1089; H04L 65/4015; H04L 65/4084; H04L 65/4092
USPC .......................... 725/34, 38, 40, 61
See application file for complete search history.

(56) References Cited

U.S. PATENT DOCUMENTS

| | | | |
|---|---|---|---|
| 5,485,221 A | 1/1996 | Banker et al. |
| 5,563,648 A | 10/1996 | Menand et al. |
| 5,579,057 A | 11/1996 | Banker et al. |
| 5,592,551 A | 1/1997 | Lett et al. |
| 5,600,364 A | 2/1997 | Hendricks et al. |
| 5,631,694 A | 5/1997 | Aggarwal et al. |
| 5,671,377 A | 9/1997 | Bleidt et al. |
| 5,689,799 A | 11/1997 | Dougherty et al. |
| 5,706,434 A | 1/1998 | Kremen et al. |
| 5,708,845 A | 1/1998 | Wistendahl et al. |
| 5,727,159 A | 3/1998 | Kikinis |
| 5,742,680 A | 4/1998 | Wilson |
| 5,774,660 A | 6/1998 | Brendel et al. |
| 5,774,664 A | 6/1998 | Hidary et al. |
| 5,774,666 A | 6/1998 | Portuesi |
| 5,809,242 A | 9/1998 | Shaw et al. |
| 5,818,438 A | 10/1998 | Howe et al. |
| 5,819,269 A | 10/1998 | Uomini |
| 5,826,258 A | 10/1998 | Gupta et al. |
| 5,848,396 A | 12/1998 | Gerace |
| 5,872,588 A | 2/1999 | Aras et al. |
| 5,881,284 A | 3/1999 | Kubo |
| 5,895,477 A | 4/1999 | Orr et al. |
| 5,907,322 A | 5/1999 | Kelly et al. |
| 5,925,595 A | 7/1999 | Seitz et al. |
| 5,929,849 A | 7/1999 | Kikinis |
| 5,937,331 A | 8/1999 | Kalluri et al. |
| 5,961,603 A | 10/1999 | Kunkel et al. |
| 5,969,715 A | 10/1999 | Dougherty et al. |
| 5,982,445 A | 11/1999 | Eyer et al. |
| 5,991,306 A | 11/1999 | Burns et al. |
| 6,002,394 A | 12/1999 | Schein et al. |
| 6,006,256 A | 12/1999 | Zdepski et al. |
| 6,008,836 A | 12/1999 | Bruck et al. |
| 6,014,134 A | 1/2000 | Bell et al. |
| 6,014,502 A | 1/2000 | Moraes |
| 6,018,764 A | 1/2000 | Field et al. |
| 6,018,768 A | 1/2000 | Ullman et al. |
| 6,025,837 A | 2/2000 | Matthews, III et al. |
| 6,029,045 A | 2/2000 | Picco et al. |
| 6,049,333 A | 4/2000 | LaJoie et al. |
| 6,055,566 A | 4/2000 | Kikinis |
| 6,061,056 A | 5/2000 | Menard et al. |
| 6,067,107 A | 5/2000 | Travaille et al. |
| 6,076,734 A | 6/2000 | Dougherty et al. |
| 6,101,510 A | 8/2000 | Stone et al. |
| 6,122,658 A | 9/2000 | Chaddha |
| 6,169,543 B1 | 1/2001 | Wehmeyer |
| 6,177,931 B1 | 1/2001 | Alexander et al. |
| 6,182,072 B1 | 1/2001 | Leak et al. |
| 6,188,398 B1 | 2/2001 | Collins-Rector et al. |
| 6,205,582 B1 | 3/2001 | Hoarty |
| 6,209,130 B1 | 3/2001 | Rector, Jr. et al. |
| 6,219,042 B1 | 4/2001 | Anderson et al. |
| 6,230,319 B1 | 5/2001 | Britt, Jr. et al. |
| 6,233,546 B1 | 5/2001 | Datig |
| 6,233,592 B1 | 5/2001 | Schnelle et al. |
| 6,237,022 B1 | 5/2001 | Bruck et al. |
| 6,240,555 B1 | 5/2001 | Shoff et al. |
| 6,253,238 B1 | 6/2001 | Lauder et al. |
| 6,263,501 B1 | 7/2001 | Schein et al. |
| 6,275,989 B1 | 8/2001 | Broadwin et al. |
| 6,295,058 B1 | 9/2001 | Hsu et al. |
| 6,297,853 B1 | 10/2001 | Sharir et al. |
| 6,301,584 B1 | 10/2001 | Ranger |
| 6,308,206 B1 | 10/2001 | Singh |
| 6,320,621 B1 * | 11/2001 | Fu ..................... H04N 5/44513 348/465 |
| 6,327,574 B1 | 12/2001 | Kramer et al. |
| 6,338,094 B1 | 1/2002 | Scott et al. |
| 6,345,292 B1 | 2/2002 | Daugherty et al. |
| 6,357,042 B2 | 3/2002 | Srinivasan et al. |
| 6,363,525 B1 | 3/2002 | Dougherty et al. |
| 6,373,609 B1 | 4/2002 | Mizrahi |
| 6,415,303 B1 | 7/2002 | Meier et al. |
| 6,421,069 B1 | 7/2002 | Ludtke et al. |
| 6,424,717 B1 | 7/2002 | Pinder et al. |
| 6,430,624 B1 | 8/2002 | Jamtgaard et al. |
| 6,434,747 B1 | 8/2002 | Khoo et al. |
| 6,446,261 B1 | 9/2002 | Rosser |
| 6,457,103 B1 | 9/2002 | Challenger et al. |
| 6,459,427 B1 | 10/2002 | Mao et al. |
| 6,460,180 B1 | 10/2002 | Park et al. |
| 6,471,392 B1 | 10/2002 | Holl et al. |
| 6,473,609 B1 | 10/2002 | Schwartz et al. |
| 6,473,858 B1 | 10/2002 | Shimomura et al. |
| 6,496,981 B1 | 12/2002 | Wistendahl et al. |
| 6,510,557 B1 | 1/2003 | Thrift |
| 6,513,019 B2 | 1/2003 | Lewis |
| 6,513,069 B1 | 1/2003 | Abato et al. |
| 6,513,160 B2 | 1/2003 | Dureau |
| 6,515,349 B2 | 2/2003 | Terashima |
| 6,516,349 B1 | 2/2003 | Lieberman |
| 6,518,950 B1 | 2/2003 | Dougherty et al. |
| 6,530,082 B1 | 3/2003 | Del Sesto et al. |
| 6,536,041 B1 | 3/2003 | Knudson et al. |
| 6,542,593 B1 | 4/2003 | Bowman-Amuah |
| 6,546,488 B2 | 4/2003 | Dillon et al. |
| 6,547,754 B1 | 4/2003 | Evans et al. |
| 6,553,409 B1 | 4/2003 | Zhang et al. |
| 6,564,251 B2 | 5/2003 | Katariya et al. |
| 6,564,263 B1 | 5/2003 | Bergman et al. |
| 6,571,392 B1 | 5/2003 | Zigmond et al. |
| 6,574,793 B1 | 6/2003 | Ngo et al. |
| 6,574,795 B1 | 6/2003 | Carr |
| 6,577,346 B1 | 6/2003 | Perlman |
| 6,584,153 B1 | 6/2003 | Gordon et al. |
| 6,601,103 B1 | 7/2003 | Goldschmidt Iki et al. |
| 6,614,914 B1 | 9/2003 | Rhoads et al. |
| 6,615,408 B1 | 9/2003 | Kaiser et al. |
| 6,637,032 B1 | 10/2003 | Feinleib |
| 6,640,145 B2 | 10/2003 | Hoffberg et al. |
| 6,643,652 B2 | 11/2003 | Helgeson et al. |
| 6,651,218 B1 | 11/2003 | Adler et al. |
| 6,654,754 B1 | 11/2003 | Knauft et al. |
| 6,668,378 B2 | 12/2003 | Leak et al. |
| 6,675,350 B1 | 1/2004 | Abrams et al. |
| 6,676,350 B1 | 1/2004 | McSherry et al. |
| 6,681,393 B1 | 1/2004 | Bauminger et al. |
| 6,698,020 B1 | 2/2004 | Zigmond et al. |
| 6,698,023 B2 | 2/2004 | Levitan |
| 6,718,551 B1 | 4/2004 | Swix et al. |
| 6,725,461 B1 | 4/2004 | Dougherty et al. |
| 6,730,624 B2 | 5/2004 | Motoki et al. |
| 6,735,487 B1 | 5/2004 | Marshall et al. |
| 6,742,043 B1 | 5/2004 | Moussa et al. |
| 6,745,368 B1 | 6/2004 | Boucher et al. |
| 6,750,919 B1 | 6/2004 | Rosser |
| 6,756,997 B1 | 6/2004 | Ward, III et al. |
| 6,757,708 B1 | 6/2004 | Craig et al. |
| 6,779,154 B1 | 8/2004 | Nussbaum et al. |

(56) References Cited

U.S. PATENT DOCUMENTS

| | | |
|---|---|---|
| 6,785,902 B1 | 8/2004 | Zigmond et al. |
| 6,792,616 B1 | 9/2004 | Jerding et al. |
| 6,799,326 B2 | 9/2004 | Boylan, III et al. |
| 6,799,327 B1 | 9/2004 | Reynolds et al. |
| 6,810,526 B1 | 10/2004 | Menard et al. |
| 6,813,372 B2 | 11/2004 | Standridge et al. |
| 6,826,597 B1 | 11/2004 | Lonnroth et al. |
| 6,839,903 B1 | 1/2005 | Shintani et al. |
| 6,847,969 B1 | 1/2005 | Mathai et al. |
| 6,925,595 B1 | 8/2005 | Whitledge et al. |
| 6,934,963 B1 | 8/2005 | Reynolds et al. |
| 6,938,270 B2 | 8/2005 | Blackketter et al. |
| 6,941,474 B2 | 9/2005 | Boies et al. |
| 6,941,574 B1 | 9/2005 | Broadwin et al. |
| 7,028,327 B1 | 4/2006 | Dougherty et al. |
| 7,062,777 B2 | 6/2006 | Alba et al. |
| 7,079,176 B1 | 7/2006 | Freeman et al. |
| 7,080,039 B1 | 7/2006 | Marsh |
| 7,100,183 B2 | 8/2006 | Kunkel et al. |
| 7,103,605 B1 | 9/2006 | Hazi et al. |
| 7,103,904 B1 | 9/2006 | Blackketter et al. |
| 7,143,042 B1 | 11/2006 | Sinai et al. |
| 7,143,428 B1 | 11/2006 | Bruck et al. |
| 7,168,084 B1 | 1/2007 | Hendricks et al. |
| 7,222,155 B1 | 5/2007 | Gebhardt et al. |
| 7,222,163 B1 | 5/2007 | Girouard et al. |
| 7,287,018 B2 | 10/2007 | Lennon |
| 7,394,816 B1 | 7/2008 | Bill |
| 7,500,188 B1 | 3/2009 | Trapani et al. |
| 7,500,195 B2 | 3/2009 | Sahota et al. |
| 7,512,799 B1* | 3/2009 | Chow .................. H04L 63/0815 713/172 |
| 7,530,016 B2 | 5/2009 | Sahota et al. |
| 7,631,326 B2* | 12/2009 | Kaneko .................. H04N 7/165 725/137 |
| 7,631,338 B2 | 12/2009 | Del Sesto et al. |
| 7,634,787 B1 | 12/2009 | Gebhardt et al. |
| 7,650,376 B1 | 1/2010 | Blumenau |
| 7,653,687 B2 | 1/2010 | Reisman |
| 7,653,923 B2 | 1/2010 | Flickinger |
| 7,668,963 B1 | 2/2010 | Miner et al. |
| 7,702,995 B2 | 4/2010 | Sahota et al. |
| 7,783,968 B2 | 8/2010 | Sahota et al. |
| 7,930,631 B2 | 4/2011 | Sahota et al. |
| 7,941,564 B2 | 5/2011 | Gebhardt et al. |
| 7,958,457 B1 | 6/2011 | Brandenberg et al. |
| 8,032,651 B2 | 10/2011 | Miner et al. |
| 8,079,045 B2 | 12/2011 | Krapf et al. |
| 8,296,792 B2 | 10/2012 | Sahota et al. |
| 8,407,744 B2 | 3/2013 | Moon et al. |
| 8,447,840 B1* | 5/2013 | Fong ..................... H04L 67/025 709/219 |
| 8,650,480 B2 | 2/2014 | Sahota et al. |
| 8,667,387 B2 | 3/2014 | Sahota et al. |
| 8,667,530 B2 | 3/2014 | Sahota et al. |
| 8,935,719 B2 | 1/2015 | Sargent |
| 8,973,056 B2 | 3/2015 | Ellis et al. |
| 10,244,203 B1* | 3/2019 | Enigma ................. H04N 7/0882 |
| 2001/0001160 A1* | 5/2001 | Shoff ..................... H04N 21/4722 725/51 |
| 2001/0003212 A1 | 6/2001 | Marler et al. |
| 2001/0003828 A1 | 6/2001 | Peterson et al. |
| 2001/0011265 A1 | 8/2001 | Cuan et al. |
| 2001/0023436 A1 | 9/2001 | Srinivasan et al. |
| 2001/0027491 A1 | 10/2001 | Terretta et al. |
| 2001/0037500 A1 | 11/2001 | Reynolds et al. |
| 2001/0047298 A1 | 11/2001 | Moore et al. |
| 2001/0047518 A1 | 11/2001 | Sahota et al. |
| 2001/0051031 A1 | 12/2001 | Hada et al. |
| 2001/0054031 A1 | 12/2001 | Lee et al. |
| 2001/0056460 A1 | 12/2001 | Sahota et al. |
| 2002/0010928 A1* | 1/2002 | Sahota ................... G06F 17/3089 725/40 |
| 2002/0011265 A1 | 1/2002 | Ganachaud |
| 2002/0042920 A1* | 4/2002 | Thomas ................. G06F 3/0481 725/87 |
| 2002/0046237 A1 | 4/2002 | Yokokura |
| 2002/0046273 A1 | 4/2002 | Lahr et al. |
| 2002/0049749 A1 | 4/2002 | Helgeson et al. |
| 2002/0056087 A1 | 5/2002 | Berezowski et al. |
| 2002/0059644 A1 | 5/2002 | Andrade et al. |
| 2002/0075403 A1 | 6/2002 | Barone et al. |
| 2002/0087999 A1* | 7/2002 | Kashima ............... H04N 5/4401 725/100 |
| 2002/0104086 A1 | 8/2002 | Tomsen et al. |
| 2002/0112226 A1* | 8/2002 | Brodersen ............ G11B 27/034 717/140 |
| 2002/0112237 A1 | 8/2002 | Kelts |
| 2002/0131511 A1 | 9/2002 | Zenoni |
| 2002/0136448 A1 | 9/2002 | Bortolussi et al. |
| 2002/0138849 A1 | 9/2002 | Blackketter et al. |
| 2002/0184624 A1* | 12/2002 | Spencer ................. H04N 7/163 725/39 |
| 2002/0184627 A1 | 12/2002 | Alba et al. |
| 2003/0018971 A1* | 1/2003 | McKenna, Jr. .... H04N 21/4828 725/40 |
| 2003/0023971 A1* | 1/2003 | Martinolich ........... H04N 7/088 725/32 |
| 2003/0028873 A1 | 2/2003 | Lemmons |
| 2003/0131311 A1 | 7/2003 | McNamara |
| 2003/0149581 A1 | 8/2003 | Chaudhri et al. |
| 2004/0006747 A1 | 1/2004 | Tyler |
| 2004/0133910 A1 | 7/2004 | Gordon et al. |
| 2005/0071877 A1* | 3/2005 | Navarro ................. H04H 40/90 725/68 |
| 2005/0108633 A1 | 5/2005 | Sahota et al. |
| 2005/0108634 A1 | 5/2005 | Sahota et al. |
| 2005/0108637 A1 | 5/2005 | Sahota et al. |
| 2005/0114757 A1 | 5/2005 | Sahota et al. |
| 2005/0132420 A1 | 6/2005 | Howard et al. |
| 2005/0149968 A1 | 7/2005 | Konig et al. |
| 2005/0152676 A1* | 7/2005 | Yoo ..................... H04N 9/8042 386/248 |
| 2005/0193410 A1 | 9/2005 | Eldering |
| 2005/0216932 A1 | 9/2005 | Danker |
| 2005/0235318 A1 | 10/2005 | Grauch et al. |
| 2006/0130120 A1 | 6/2006 | Brandyberry et al. |
| 2006/0143655 A1* | 6/2006 | Ellis ................... H04N 5/44543 725/47 |
| 2006/0168624 A1 | 7/2006 | Carney et al. |
| 2006/0173560 A1 | 8/2006 | Widrow |
| 2006/0236342 A1 | 10/2006 | Kunkel et al. |
| 2007/0091919 A1 | 4/2007 | Sandoval |
| 2007/0130581 A1 | 6/2007 | Del Sesto et al. |
| 2007/0136753 A1 | 6/2007 | Bovenschulte et al. |
| 2007/0157249 A1 | 7/2007 | Cordray et al. |
| 2007/0162961 A1* | 7/2007 | Tarrance ................ G06F 21/33 726/5 |
| 2008/0010659 A1 | 1/2008 | Zenith |
| 2008/0098446 A1* | 4/2008 | Seckin .................. H04L 12/185 725/114 |
| 2008/0109843 A1 | 5/2008 | Ullah |
| 2008/0215428 A1 | 9/2008 | Ramer et al. |
| 2008/0319852 A1 | 12/2008 | Gardner et al. |
| 2009/0031374 A1* | 1/2009 | Choi ..................... G06Q 20/1235 725/104 |
| 2009/0119723 A1 | 5/2009 | Tinsman |
| 2009/0150553 A1* | 6/2009 | Collart ................. G11B 27/105 709/229 |
| 2009/0193456 A1 | 7/2009 | Ahn et al. |
| 2009/0199114 A1 | 8/2009 | Lewis et al. |
| 2009/0217329 A1 | 8/2009 | Riedl et al. |
| 2009/0254931 A1 | 10/2009 | Pizzurro et al. |
| 2010/0017597 A1* | 1/2010 | Chandwani ........ H04L 61/2015 713/156 |
| 2010/0153831 A1* | 6/2010 | Beaton ................. G06Q 30/0603 715/201 |
| 2010/0161826 A1 | 6/2010 | Miner et al. |
| 2010/0171741 A1* | 7/2010 | Brill ..................... G06T 19/00 345/424 |
| 2010/0174783 A1* | 7/2010 | Zarom ................... G06F 9/526 709/205 |

(56) References Cited

U.S. PATENT DOCUMENTS

| | | |
|---|---|---|
| 2010/0215340 A1 | 8/2010 | Pettit et al. |
| 2010/0251279 A1 | 9/2010 | Piard et al. |
| 2010/0268773 A1 | 10/2010 | Hunt et al. |
| 2010/0309196 A1 | 12/2010 | Castleman |
| 2010/0332315 A1 | 12/2010 | Kamar et al. |
| 2010/0333153 A1 | 12/2010 | Sahota et al. |
| 2011/0119478 A1 | 5/2011 | Jackson |
| 2011/0191667 A1 | 8/2011 | Sahota et al. |
| 2012/0041825 A1 | 2/2012 | Kasargod et al. |
| 2012/0084812 A1 | 4/2012 | Thompson et al. |
| 2012/0117584 A1* | 5/2012 | Gordon ............... H04N 21/254 725/19 |
| 2012/0189272 A1* | 7/2012 | Kunigita ............ H04N 21/4788 386/239 |
| 2013/0014155 A1* | 1/2013 | Clarke ................. G06F 16/433 725/32 |
| 2013/0014192 A1 | 1/2013 | Sahota et al. |
| 2013/0051770 A1 | 2/2013 | Sargent |
| 2013/0117406 A1 | 5/2013 | Chevillat et al. |
| 2013/0144725 A1 | 6/2013 | Li et al. |
| 2013/0173742 A1* | 7/2013 | Thomas ............. H04L 65/4076 709/217 |
| 2013/0179925 A1* | 7/2013 | Woods ............ H04N 21/42209 725/42 |
| 2013/0205343 A1* | 8/2013 | Kirby ................. H04N 21/4307 725/51 |
| 2013/0325603 A1 | 12/2013 | Shamir et al. |
| 2013/0347018 A1* | 12/2013 | Limp ................. H04N 21/4394 725/19 |
| 2014/0018033 A1 | 1/2014 | Luna |
| 2014/0053223 A1* | 2/2014 | Vorobyov ............... G10L 13/00 725/110 |
| 2014/0115472 A1* | 4/2014 | Mochinaga .......... H04N 13/189 715/719 |
| 2014/0130085 A1 | 5/2014 | Sahota et al. |
| 2014/0181855 A1* | 6/2014 | Fife ................. H04N 21/25841 725/25 |
| 2014/0189500 A1 | 7/2014 | Sahota et al. |
| 2014/0201769 A1 | 7/2014 | Neumeier et al. |
| 2014/0282653 A1 | 9/2014 | Ariantaj et al. |
| 2014/0282735 A1 | 9/2014 | Davis et al. |
| 2014/0379855 A1 | 12/2014 | Sahota et al. |
| 2015/0156564 A1 | 6/2015 | Sargent |

FOREIGN PATENT DOCUMENTS

| | | |
|---|---|---|
| EP | 0942595 A2 | 9/1999 |
| EP | 1269750 A1 | 1/2003 |
| EP | 1286541 A1 | 2/2003 |
| EP | 1381961 A1 | 1/2004 |
| EP | 1826981 A1 | 8/2007 |
| EP | 1954054 A1 | 8/2008 |
| WO | 2000078043 A1 | 12/2000 |
| WO | 2001058159 A1 | 8/2001 |
| WO | 01/82614 A1 | 11/2001 |
| WO | 0182613 A1 | 11/2001 |
| WO | 2002086746 A1 | 10/2002 |
| WO | 03017129 A1 | 2/2003 |
| WO | 2005006758 A1 | 1/2005 |

OTHER PUBLICATIONS

Heather Wilner "Verizon FiOS Brings You the 2012 London Summer Olympic Games," 3 pages, available at <http://forums.verizon.com/t5/Verizon-at-Home/Verizon-FiOS-Brings-You-the-2012-London-Summer-Olympic-Games/ba-p/462267> (Jul. 23, 2012, accessed Mar. 5, 2014).

Extended European Search Report—EP 14159424.2—dated May 13, 2014.

Extended European Search Report—EP Appl. 15158005.7—dated Jul. 29, 2015.

"Spyglass Prism: Concepts and Applications", Spyglass Inc, 1997, pp. 1-8.

Puder, A., et al, "Position Papers: System Support for Knowledge-Based Trading in Open Service Markets", Proceedings of the 7th Workshop on ACM SIGOPS European Workshop: Systems Support for Worldwide Applications, Sep. 1996, pp. 289-296.

Ensink, Brian, et al, "XML Based Adaptation of the Composite Approach for Database Integration", Proceedings of the 37th Annual Southeast Regional Conference (CD-ROM), Apr. 1999, pp. 1-6.

Arens, Yigal, et al, "Intelligent Caching: Selecting, Representing, and Reusing Data in an Information Server", Proceedings of the Third International Conference on Information and Knowledge Management, Nov. 1994, pp. 433-438.

Spencer, Ken, "Using XML to Build Internet Solutions", Windows IT Pro, http://www.winntmag.com/Articles/Print.cfm?ArticleiD=5056, Apr. 1999.

Bayardo, R J., et al., "InfoSieuth: Agent-Based Semantic Integration of Information in Open and Dynamic Environments", ACM SIGMOD Record, (Jun. 1997), vol. 26, Issue 2, pp. 195-206.

Calvary, Gaelle, et al., "From Single-User Architectural Design to PAC: a Generic Software Architecture Model for CSCW", Proceedings of the SIGCHI Conference on Human Factors in Computing Systems, (Mar. 1997), pp. 342-349.

Wegner, Lutz, et al, "Applications: A Visual Interface for Synchronous Collaboration and Negotiated Transactions", Proceedings of the Workshop on Advanced Visual Interfaces, May 1996, pp. 156-165.

Bulterman, Dick C., "Embedded Video in Hypermedia Documents: Supporting Integration and Adaptive Control", ACM Transactions on Information Systems (TOIS), vol. 13, Issue 4, Oct. 1995, pp. 440-470.

Hijiri, Toshiki, et al, "A Spatial Hierarchical Compression Method for 3D Streaming Animation", Proceedings of the Fifth Symposium on Virtual Reality Modeling Language (Web3D-VRML), Feb. 2000, pp. 95-101.

Glushko, Robert J., et al, "An XML Framework for Agent-Based E-Commerce", Communications of the ACM, vol. 42, No. 3, Mar. 1999, pp. 106-114.

Claypool, Kajal, et al., "OQL_SERF: An ODMG Implementation of the Template-Based Schema Evolution Framework", Proceedings of the 1998 Conference of the Centre for Advanced Studies on Collaborative Research, (Nov. 1998), pp. 1-15.

Fraisse. S, et al., "Generating Hypermedia Form Specifications by Sketching Multimedia Templates", ACM, (1996), pp. 353-363.

Iyengar, Arun , et al., "Improving Web Server Performance by Caching Dynamic Data", proceedings of the US EN IX Symposium on Internet Technologies and Systems, (Dec. 1997), pp. 1-13.

Puerta, Angel, et al., "Towards a General Computational Framework for Model-Based Interface Development", Proceedings of the 4th International Conference on Intelligent User Interfaces, (Dec. 1998), pp. 171-178.

Shim, Simons., et al., "Template Based Synchronized Multimedia Integration Language Authoring Tool", SPIE Conference on Internet Imaging, (Dec. 1999), vol. 3964, pp. 134-142.

"XHTML 1.0: The Extensible HyperText Markup Language, A Reformulation of HTML 4.0 in XML 1.0", www.w3.org, downloaded from http://www.w3.org!TR/19991WD-html-in-xml-199902241, Feb. 24, 1999, pp. 1-15.

Barta, Robert, et al, "Syndication with JML", Proceedings of the 2000 ACM Symposium on Applied Computing—vol. 2, ACM Press, Mar. 2000, pp. 962-970.

Kuchling, Andrew, "XML, the eXtensible Markup Language", Linux Journal, Specialized Systems Consultants, Inc., Nov. 1998, pp. 1-3.

Microsoft Computer Dictionary, Third Edition, Microsoft Press, 1997. p. 505.

Smith, John R., et al. "Scalable Multimedia Delivery for Pervasive Computing", Proceedings of the Seventh ACM International Conference on Multimedia (Part 1), Oct. 1999, pp. 131-140.

Microsoft Computer Dictionary, Third Edition, Microsoft Press, 1997, p. 368.

International Preliminary Examination Report, PCT/US01/13244, dated Feb. 18, 2003 (11 pages).

(56) References Cited

OTHER PUBLICATIONS

"Advanced Television Enhancement Forum Specification (ATVEF)", ATVEF, 34 pages, Feb. 2, 1999.
Palmer, Jonathan W., et al, "Digital Newspapers Explore Marketing on the Internet", Communications of the ACM, vol. 42, Issue 9, Sep. 1999, pp. 32-40.
Hodes, Todd D., et al, "Composable Ad Hoc Location-Based Services for Heterogeneous Mobile Clients", Wireless Networks, vol. 5, Issue 5, Oct. 1999, pp. 411-427.
International Search Report for International Application No. PCTIUS01/13244 (Metatv, Inc.), dated Sep. 10, 2001.
International Search Report for International Application No. PCT/US01/13243 (Metatv, Inc.) dated Oct. 10, 2001.
Morris S: "The MHP Tutorial", Internet Citation, 2002, XP002281053, retrieved from the Internet: URL: http://www.mhp-interactive.org/tutorials/mhp/printerfriendly/ (retrieved on May 19, 2004).
Extended European Search Report—EP12181319—dated Dec. 19, 2012.
Steinhorn, Jason and Mark Kohler, "Enhancing TV With ATVEF" Embedded Systems Programming, Oct. 1999, pp. 55-64.
International Search Report for International Application No. PCT/US01/13241 (Metatv, Inc.), dated Sep. 10, 2001.
U.S. Appl. No. 13/800,579, Selective Interactivity, filed Mar. 13, 2013.
European Office Action—EP App 14159424.2—dated Sep. 27, 2016.
May 14, 2018—Canadian Office Action—CA 2,787,562.
Oct. 30, 2018—European Summons to Oral Proceedings—EP 14159424.2.
Sep. 17, 2018—European Office Action—EP 15158005.7.
Feb. 8, 2019—Canadian Office Action—2,787,562.
Oct. 8, 2019—Canadian Office Action—CA 2,787,562.
May 25, 2020—Canadian Office Action—CA 2,787,562.
Mar. 16, 2020—European Office Action—EP 15158005.7.
Apr. 9, 2021—Canadian Office Action—CA 2,882,503.

* cited by examiner

RETRIEVING SUPPLEMENTAL CONTENT

BACKGROUND

Viewers consume and experience content across a wide range of devices and content distribution systems. For example, viewers may watch a television program displayed on a television while looking up related social networking content on the internet using a second device, such as a tablet. Some television content providers may provide an address of a website that users can visit on their personal computers or tablets to view additional content. However, having users copy or enter an address onto other devices detracts from a fully integrated user experience. These and other shortcomings are addressed by the present disclosure.

SUMMARY

The following summary is for illustrative purposes only, and is not intended to limit or constrain the detailed description.

Some of the features described herein may allow a content provider, a data services provider, a network operator, or the like, to provide supplemental content to a viewer of a content item through use of an embedded identifier. The embedded identifier may, in one embodiment, indicate or identify an address of supplemental content identifying data. The supplemental content identifying data may identify one or more supplemental content items associated with the content item and available to the viewer. An address or other identifier in the supplemental content identifying data may be used to retrieve at least a portion of the available one or more supplemental content items, and a display may be generated combining the content item with the supplemental content.

In some embodiments, the identifier may be securely provided to a client and may be authenticated as part of retrieving supplemental content associated with the content item. The identifier may comprise a trusted token or security token used to authenticate the supplemental content identifying data associated with the content item.

Through use of some of the various features described herein, only a small identifier may need to be transmitted in order to enable a user to retrieve a significant amount of supplemental content.

In some embodiments, a method of retrieving supplemental content is provided. The method may comprise receiving an identifier of data, such as supplemental content identifying data or a metadata listing associated with a first content item. The identifier may be used to retrieve additional information such as the supplemental content identifying data. Supplemental content associated with the first content item may be accessed based on at least a portion of the supplemental content identifying data. A presentation of the supplemental content may be generated, for example, when requested by a user.

In some embodiments, the identifier may be a URI encoded within a transmission medium associated with the first content item. As an example, the transmission medium may be a content broadcast provided by a content provider, a data services provider, a network operator, and the like. As a further example, in some embodiments the transmission medium may be a MPEG stream including the first content. Any other appropriate transmission medium may be used to provide the first content item and the identifier. The transmission medium may contain data corresponding to the first content item and data associated with the first content item, such as the supplemental content or the identifier. For example, where the transmission medium includes data corresponding to closed-captioning data associated with the first content item, the URI may be encoded in the closed-captioning portion of the transmission medium associated with the first content item. In some embodiments, the identifier may be encoded in a program map associated with the first content item, or the identifier may be encoded in a program association table.

In some embodiments the identifier may comprise a trusted token or may be at least partially encrypted. The identifier may be received by parsing a portion of the transmission medium associated with the first content item to detect the identifier according to an expected syntax or format.

The supplemental content identifying data may be any type or form of data for identifying the available supplemental content. In some embodiments, the supplemental content identifying data may be a metadata listing including an address of one or more supplemental content items and attributes of the supplemental content items. In some embodiments, the supplemental content identifying data may comprise an address of the supplemental content (e.g., an internet address), a content type associated with the supplemental content, and one or more content attributes associated with the supplemental content. In some embodiments, the supplemental content identifying data may comprise a plurality of supplemental content items and the supplemental content may be accessed by determining a desired subset of the supplemental content items, and then accessing the determined subset.

In some embodiments, a request to retrieve the supplemental content identifying data may include parameters identifying attributes of a client, a display device, and/or a gateway device. The parameters may identify display capabilities of the display device or gateway device.

In some embodiments, a request to retrieve the supplemental content may be based on an address included in the supplemental content identifying data and may comprise parameters identifying attributes of a client, a display device, and/or a gateway device.

In some embodiments, other methods of retrieving supplemental content may be provided. One method may comprise receiving an identifier of a supplemental content identifying data associated with a first content item. The supplemental content identifying data may be retrieved using the identifier. It may be determined that a user intends to access a supplemental content item associated with the first content item. The supplemental content item may be identified and/or accessed based on the supplemental content identifying data.

The identifier may be received in response to accessing the first content item, such as after a user has requested the retrieval of the first content item. In some embodiments, the supplemental content identifying data may indicate a plurality of supplemental content items and a user may be prompted to select one or more of the plurality of supplemental content items. A combined presentation of the one or more supplemental content items and the first content item may be generated.

In some embodiments, an additional identifier associated with additional supplemental content identifying data may be received in response to a second content item being accessed. The first content item may be related to the second content item. The additional supplemental content identifying data may be retrieved, and additional supplemental content may be identified and/or accessed based on the additional supplemental content identifying data.

In some embodiments, a system may be provided comprising a content processing device and a metadata server device. The content processing device and the metadata server device may be implemented by one or more computing devices. The content processing device may be configured to provide an identifier of supplemental content identifying data, and the supplemental content identifying data may indicate (e.g., point to or provide an address of) supplemental content associated with a first content item. The metadata server device may be configured to provide the supplemental content identifying data in response to a request based on the provided identifier, and the supplemental content identifying data may include an address configured to allow access to the supplemental content. In some embodiments, the request may identify attributes of a client, a display device, and/or a gateway device and the metadata server may determine suitable supplemental content based on the attributes. In some embodiments, the content processing device may be configured provide the identifier by inserting the identifier into a transmission medium associated with the first content item.

In some embodiments, other methods of retrieving supplemental content may be provided. The method may comprise receiving a token identifying supplemental content associated with a first content item. The token may be decoded to determine a URI associated with the supplemental content. The determined URI may be authenticated. Supplemental content display parameters may be retrieved according to the authenticated URI. A presentation of the supplemental content may be generated according to the supplemental content display parameters. In some embodiments, the supplemental content may be retrieved according to an address contained in the supplemental content display parameters. In some embodiments the token may be at least partially encrypted. The authentication of the determined URI may be based on a security certificate or a trusted third party, in some embodiments.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

DETAILED DESCRIPTION

Figure 1:
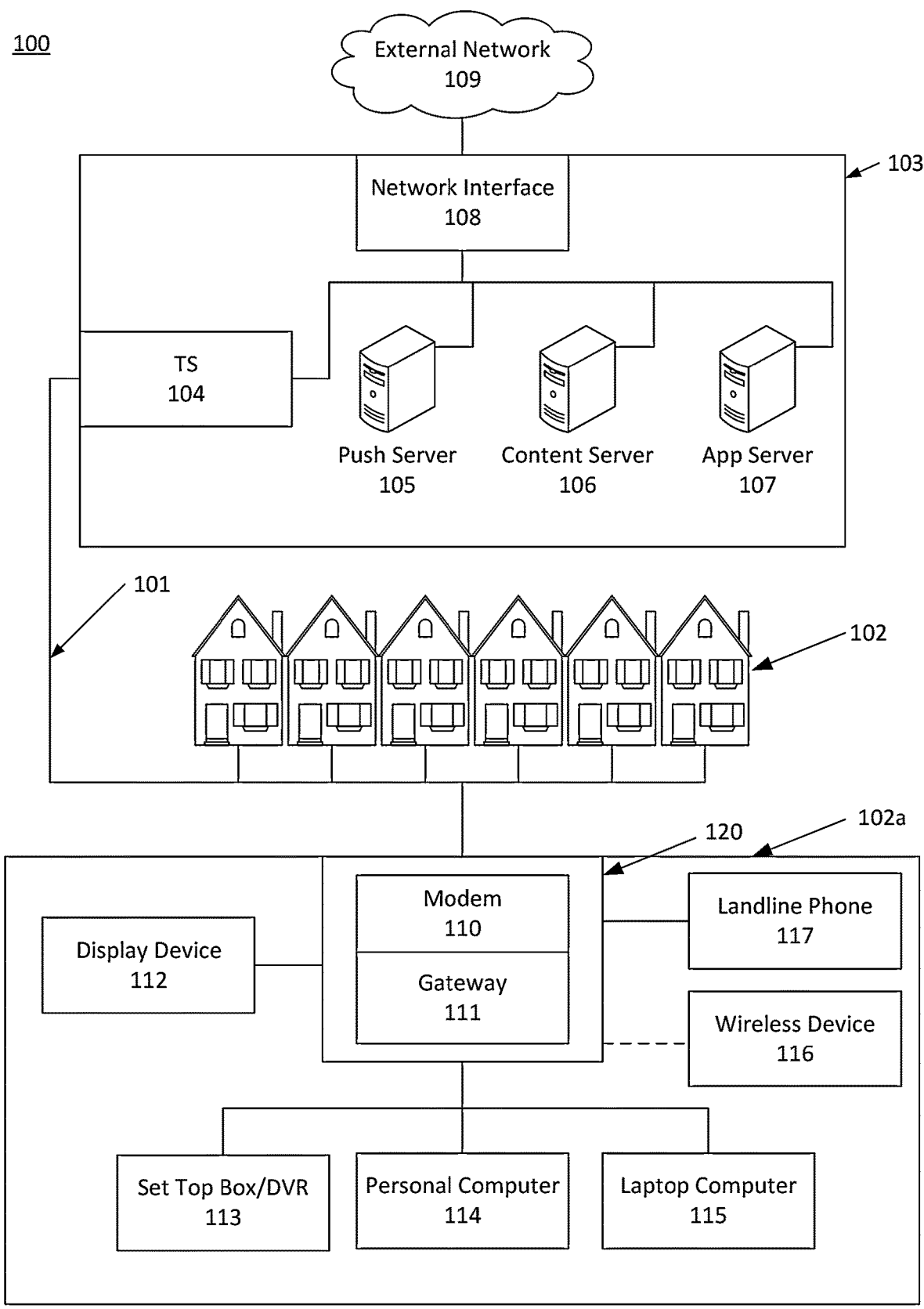
FIG. 1 illustrates an example communication network on which various features described herein may be implemented.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various features of the methods and systems described herein allow for supplemental content to be provided to viewers of an associated primary content item through use of an identifier provided with the content item. Supplemental content as used herein may be any video, audio, image, or other content designed to enhance a viewer's experience of associated primary video content. Examples of supplemental content include, but are not limited to, real-time commentary, user chat, social networking content, still images, HTML content, secondary audio streams, secondary video streams, alternate audio stream, alternate video streams, and the like. Supplemental content may also include accessibility features such as text and audio translations, display filters, contrast filters, color filters, and the like. Supplemental content may be associated with various applications provided by a gateway or display device, such as an internet video application, a social networking application, a news application, a game application, a music application, and the like. Supplemental content may be displayed on the same display device as the associated primary content, providing a combined display of the supplemental and primary content, or it may be displayed on a separate device. Supplemental content may be displayed alongside of the associated primary content, or it may be incorporated within a display of the primary content. In some embodiments, supplemental content may replace portions of the associated primary content. Supplemental content may be stored and provided separately from the primary video content.

An identifier provided in association with the primary content item may indicate the availability of supplemental content. The identifier may be inserted into a transmission medium associated with the primary content item. As an example, the transmission medium may be a content broadcast provided by a content provider, a data services provider, a network operator, and the like. As a further example, in some embodiments the transmission medium may be a MPEG stream including the first content. Any other appropriate transmission medium may be used to provide the first content item and the identifier. The transmission medium may contain data corresponding to the first content item and data associated with the first content item, such as the identifier. Inserting the identifier into the transmission medium may comprise encoding the identifier into a portion of the transmission medium. In some embodiments, the identifier may be used to retrieve supplemental content identifying data including an address of the supplemental content. The supplemental content identifying data may indicate a plurality of available supplemental content items associated with the primary content item. In some embodiments, the identifier may be securely provided to a client and may be authenticated as part of retrieving supplemental content associated with the primary content item.

Various features of the methods and systems for retrieving supplemental content discussed above will be further described below. However, first an exemplary operating environment as shown in FIGS. 1 and 2 will be described.

Figure 2:
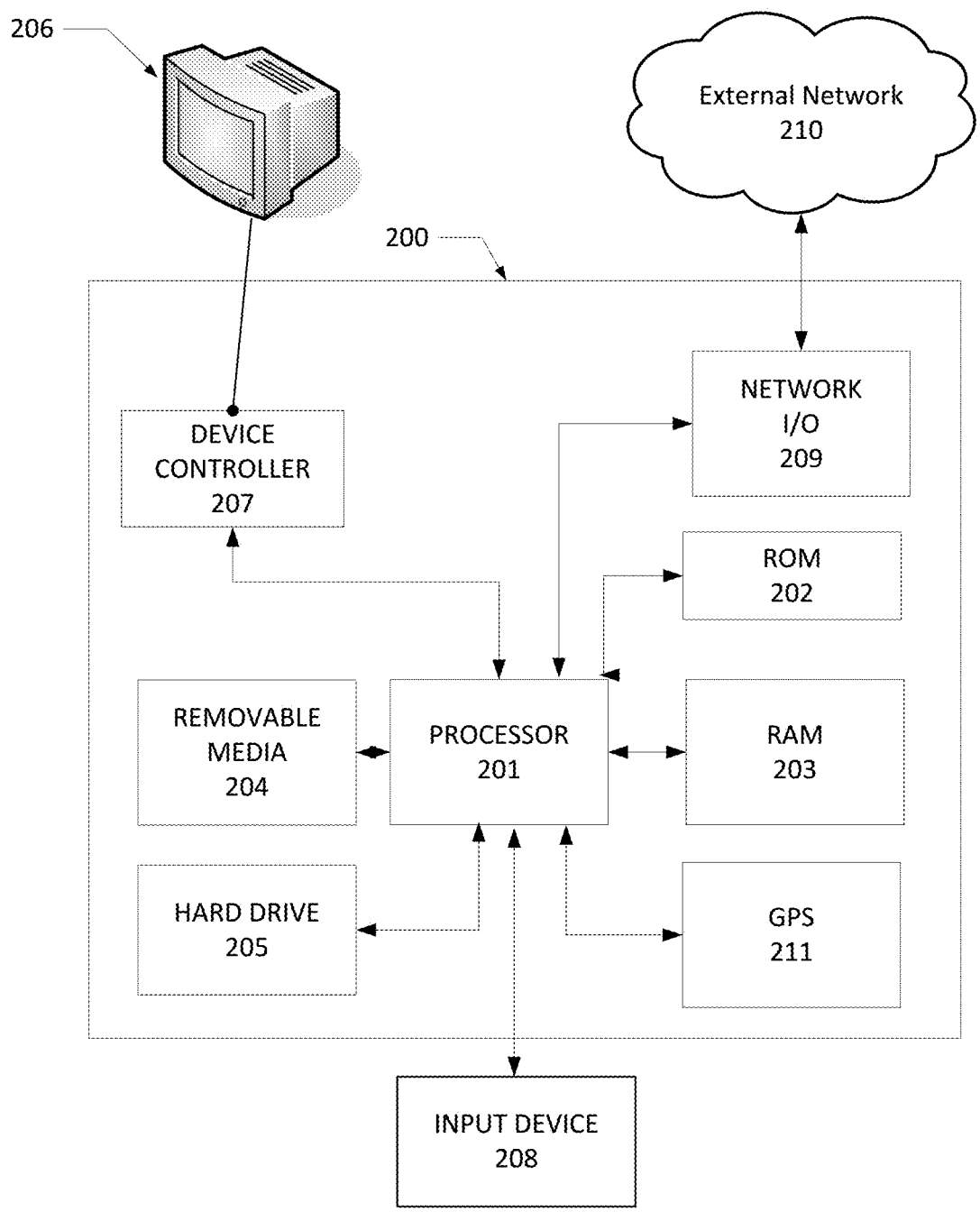
FIG. 2 illustrates an example computing device that can be used to implement any of the system, methods, servers, entities, and computing devices described herein.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicate with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Having described an example communication network shown in FIG. 1 in which various features described herein may be implemented, an example computing device as shown in FIG. 2 will be described.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, camera input for user gestures, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3A:
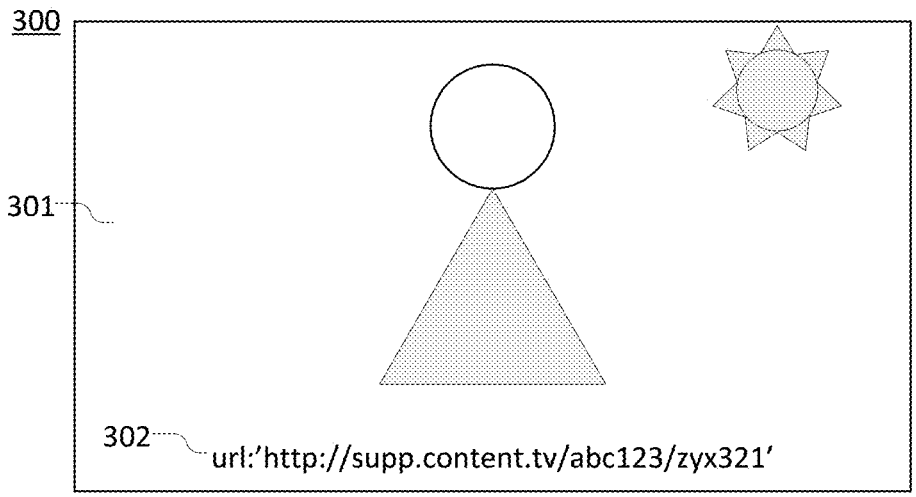
FIGS. 3A-3C illustrate example displays and/or user interfaces generated according to various features described herein.
Figure 3B:
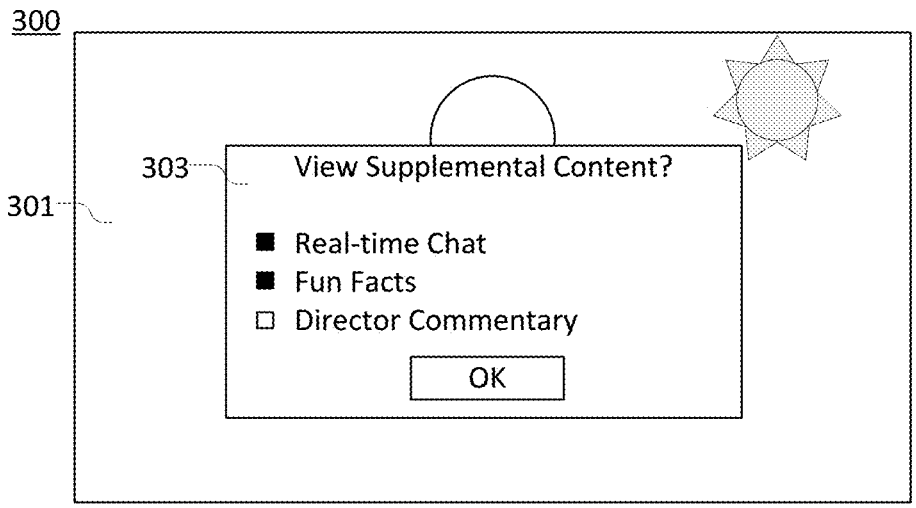
Figure 3C:
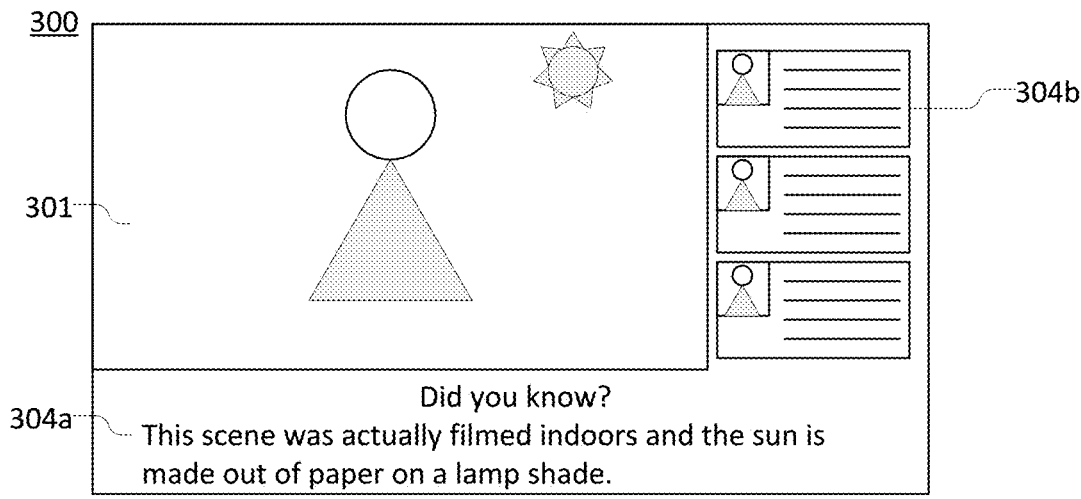

Having discussed an example network environment and computing device, discussion will now turn to illustrative displays and/or user interfaces generated according to the various techniques described herein, as shown in FIGS. 3A-3C.

FIG. 3A illustrates an example display or presentation 300 of video content, illustrated as primary content 301. Display 300 may be output by or provided to any suitable device for presenting video content to a user, such as a processor and/or other computing device outputting content for display, such as television, computer monitor, tablet computing device, smart phone, and the like. Primary content 301 may be any transmitted content item, for example a content item received by gateway 111 (FIG. 1) or another device. In some embodiments, primary content 301 may be a video program requested by the user, a video on demand (VOD) offering, a movie, a television program, an advertisement within a video program (e.g., a commercial appearing in a multicast presentation of a television program), or any other desired form of video content. The video content described herein may include an audio portion and/or other supplemental information. Primary content 301 may be received as part of a transmission medium. The transmission medium may be any appropriate medium for transmitting and receiving primary content 301. For example, primary content 301 may be a program contained in one or more elementary streams according to the MPEG-TS (Moving Pictures Expert Group—Transport Stream) standard and/or another codec/format. In some embodiments, primary content 301 may be transmitted according to one or more broadcast standards, including the set of ATSC (Advance Television Systems Committee) standards, DVB (Digital Video Broadcasting) standards, and the like.

Identifier 302 may be provided with primary content 301. Identifier 302 may indicate available supplemental content identifying data associated with primary content 301. The supplemental content identifying data may identify one or more supplemental content items and provide display parameters for the supplemental content items (e.g., 304a and 304b of FIG. 3C) associated with primary content 301. In the illustrated embodiment of FIG. 3A, identifier 302 is shown as part of display 300. While identifier 302 is shown as a URL link, it may take any suitable form such as an icon, widget, sound, indicator on a computing device, program guide indicator, and/or indicator on a supplemental device. Alternatively, in some embodiments identifier 302 may not be displayed on display 300. In some embodiments, identifier 302 may be associated with and/or comprise a URI (Uniform Resource Identifier) and/or URL (Uniform Resource Locator) providing an address of the supplemental content identifying data. In other embodiments, identifier 302 may comprise a token recognizable by gateway 111 as indicating available supplemental content identifying data. Identifier 302 may be encrypted or be authenticated through a trusted third party. For example, identifier 302 may be a trusted certificate issued through a higher level certificate authority within the content provider network and/or other remote location. The identifier may be authenticated prior to its use to prevent spoofed links in the video content and increasing the security of the network provided content. Accessing the trusted token and the token authority may also trigger logging for advertising and other purposes.

Identifier 302 may be encoded in a transmission medium associated with primary content 301. For example, identifier 302 may be encoded in supplemental information associated with a stream containing primary content 301. In some embodiments, the identifier may be encoded in the transmission medium using one or more suitable protocols such as Program and System Information Protocol (PSIP) metadata in accordance with, for example, a Programming Metadata Communication Protocol (PMCP) as, for example, defined by ATSC Standard, Document A/76B. In other embodiments, identifier 302 may be encoded in a suitable program table as described herein such as a Program Association Table (PAT) and/or otherwise associated with primary content 301. As another example, identifier 302 may be encoded in the one or more elementary streams making up a video program of primary content 301. Identifier 302 may be encoded in a video stream of the one or more elementary streams, or it may be encoded in a separate elementary stream identified in a program map associated with primary content 301. In some embodiments, identifier 302 may be encoded in a closed-caption stream associated with primary content 301. In other embodiments, identifier 302 may be encoded in a portion of the video content utilized to communicate closed-captions or other related information. One example of such a portion may be VBI (Vertical Blanking Interval) Line 21, commonly used in analog television broadcasts to provide closed-captions. The closed-caption stream or portion may be transmitted according to one or more standards for providing closed-caption content, such as the EIA-608, EIA-708, or the CEA-708 standards developed by the Electronic Industries Alliance, and the like.

In some embodiments, identifier 302 may be provided to a client upon a request for a program associated with primary content 301. In other embodiments, identifier 302 may be available at the beginning of a discrete programming content item. For example, identifier 302 may be transmitted in a closed-caption portion as a first and/or subsequent caption at a beginning of a television program. In still other embodiments, identifier 302 may be repeatedly transmitted in association with primary content 301 such that it could be accessed even after an initial request for the program is handled, and/or identifier 302 may be retrieved in response to a user action such as a button press and/or other command from a computing device such as, for example, a remote control. In some embodiments, identifier 302 may be briefly displayed when, for example, it is received as part of a transmission medium associated with primary content 301. In other embodiments, identifier 302 may not be directly displayed.

FIG. 3B illustrates a display 300 of primary content 301 subsequent to detecting identifier 302. Supplemental content prompt 303 may be generated from information such as supplemental content identifying data retrieved using identifier 302. Gateway 111 may use identifier 302 to retrieve supplemental content identifying data indicating available supplemental content associated with primary content 301. Where identifier 302 comprises a URI/URL, identifier 302 may be used as an address to retrieve the supplemental content identifying data. Where identifier 302 comprises a token, identifier 302 may be used to validate, authenticate, and/or lookup an address of the supplemental content identifying data, and/or the token may itself contain an address of the supplemental content identifying data.

The supplemental content identifying data retrieved according to identifier 302 may indicate available supplemental content associated with primary content 301. The supplemental content identifying data may indicate one or more supplemental content items associated with primary content 301. For example, the supplemental content identifying data retrieved in the example of FIG. 3B and reflected in supplemental content prompt 303 lists real-time chat, fun facts, and director commentary supplemental content items as available for primary content 301. Supplemental content prompt 303 lists the available supplemental content items for selection by a user. In other embodiments, supplemental content prompt 303 may not be used. Instead, preferences or attributes of the user, display device 112, gateway 111 (FIG. 1), and/or any other device may be used to select from available supplemental content. For example, a user may indicate that they want a French audio stream if available, or the display device may not be capable of displaying 3D content. In still other embodiments, preferences or attributes of the network 101, local office 103, external network 109, servers 105-107, and/or any of the devices in communications network 100 may be used to select from available supplemental content.

FIG. 3C illustrates a display 300 of primary content 301 in conjunction with supplemental content 304a and 304b. Supplemental content 304a may be text content, such as "fun facts" related to primary content 301. Supplemental content 304b may be real-time chat on a social networking or blogging site related to primary content 301. In FIG. 3C, display 300 of primary content 301 has been enhanced with supplemental content 304a and 304b. Primary content 301 may be scaled down or otherwise resized to provide supplemental content 304a and 304b space to be presented. Additionally or alternatively, supplemental content may be included on a generated display as super-imposed or otherwise combined with primary content 301. Further, supplemental content may replace one or more portions of primary content 301.

Figure 4:
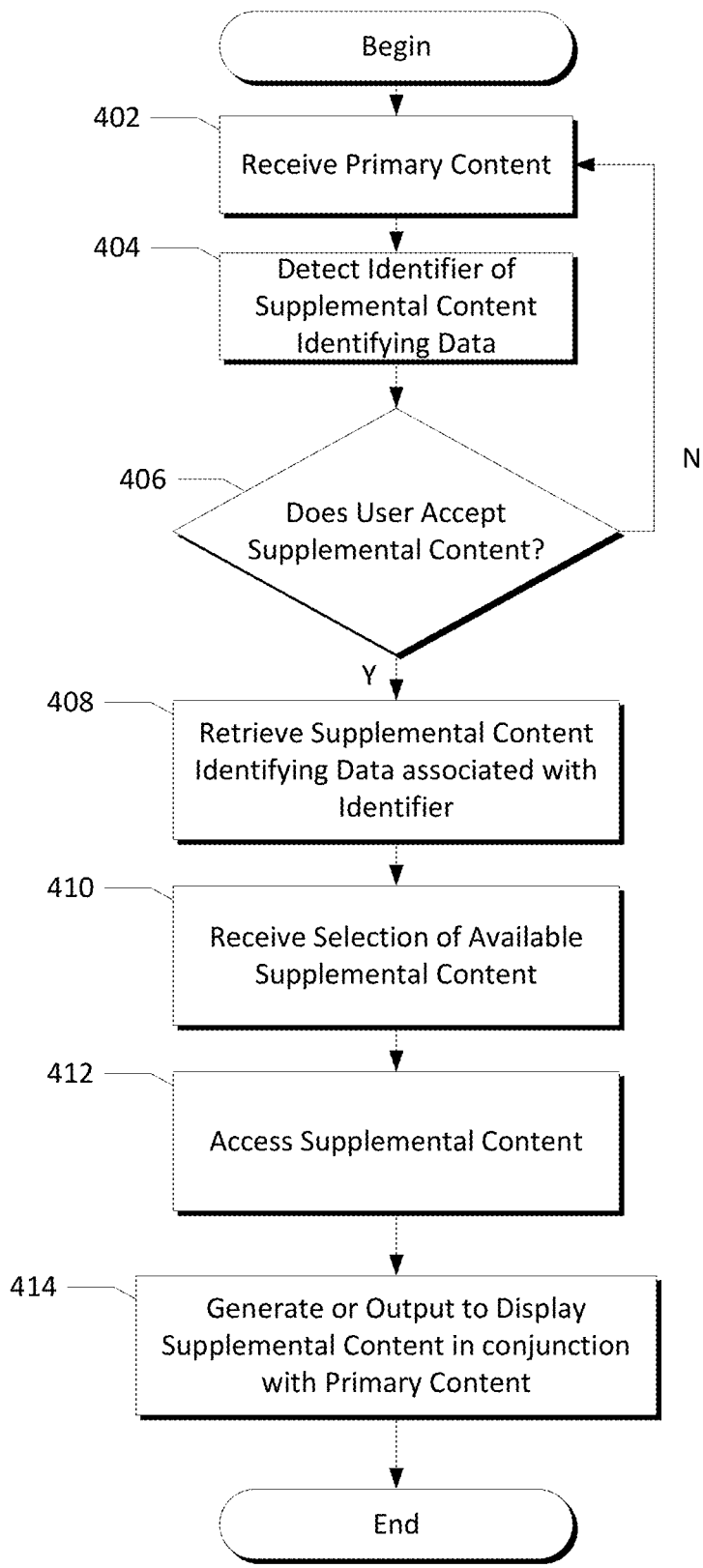
FIG. 4 illustrates an example method for implementing various features described herein.

Having described illustrative examples of a display of supplemental content associated with primary video content, methods and systems for the retrieval of supplemental content will be further described. FIG. 4 illustrates a method implementing various features of those disclosed herein for retrieving supplemental content.

FIG. 4 illustrates an example method for deploying, managing, and/or retrieving supplemental content according to some embodiments. The method of FIG. 4 may be implemented in one or more computing devices, such as computing device 200 (FIG. 2). The method may be implemented by a processor of the one or more computing devices, and executable instructions according to the method may be stored on a memory of the one or more computing devices. The one or more computing devices may be part of a network, such as network 101 (FIG. 1). The process may be implemented in a network environment having devices such as an application server 107, a user's consumption or access device (e.g., display device 112, gateway 111, personal computer 114, wireless device 116, etc.), or any other desired computing devices. The one or more computing devices may receive transmitted content from the network 101, and the transmitted content may be provided by a content provider, a data services provider, and/or a network operator, such as local office 103. In some embodiments, the method may be implemented by gateway 111.

In step 402, primary content may be received. As discussed above, primary content may be video content and may be a transmitted or accessed content item received by gateway 111. In some embodiments, the primary content may be a video program. In others, the primary content may be an advertisement and/or other content item within a video program. The primary content may be received as part of a transmission medium and may be contained in one or more elementary streams. Elementary streams associated with a program containing the primary content may be identified in a program map by a packet ID or 'ND' associated with the program.

At step 404, an identifier of supplemental content identifying data may be detected. The identifier may be provided in association with the primary content. A content provider, data services provider, network operator, and the like may provide the identifier along with the primary content. For example, the content provider may create a content stream, insert the identifier into the stream, and transmit the stream to a recipient. In some embodiments, the identifier may be associated with the primary content by an entity other than the content provider, and the content provider may provide a stream or other transmission of the primary content and the associated identifier. In some embodiments, the identifier may be encoded in a transmission medium associated with the primary content. The identifier may be encoded in supplemental information contained in the transmission medium associated with the primary content. In some embodiments, the identifier may be included in a table which may be associated with the primary content. Examples of such tables include program association tables (PAT), program guide tables, channel maps, program maps, transport stream description tables, IPMP control information, conditional access tables, and/or other tables associated with content, supplemental content, and/or programing. Additionally or alternatively, the identifier may be encoded in the one or more elementary streams making up a video program of the primary content, as discussed above. The identifier may be encoded in a video stream of the one or more elementary streams, or it may be encoded in a separate elementary stream identified in a program map. In some embodiments, the identifier may be encoded in a closed-caption stream associated with the primary content. In other embodiments, the identifier may be encoded in a portion of the video content utilized to communicate closed-captions or other related information.

The identifier may indicate available supplemental content identifying data associated with the primary content. In some embodiments, the supplemental content identifying data may be a metadata item or listing. In some embodiments, the supplemental content identifying data, such as a metadata listing, may provide display parameters for supplemental content associated with the primary content, as discussed further below. As discussed above, the identifier may be a URI/URL providing an address of the supplemental content identifying data, and/or the identifier may comprise a token recognizable as indicating available supplemental content identifying data. The identifier may be detected by parsing an appropriate portion of the transmission medium associated with the primary content. In some embodiments, the identifier may be briefly displayed when it is received as part of a transmission medium associated with the primary content. In other embodiments, the identifier is not directly displayed.

As part of detecting the identifier, step 404 may involve determining whether the identifier is valid and/or authenticated. The identifier may be checked against an expected syntax, such as a proper format for a URI. In some embodiments, the identifier may be at least partially encrypted and/or compressed. The identifier may be authenticated through a trusted third party, and/or the identifier may comprise a trusted token and/or security token issued by a known authority. Additionally and/or alternatively, a signed security certificate may be used to authenticate the identifier. In some embodiments, the identifier may be deemed valid due to a known security level of the transmission medium and/or a user security setting. In some embodiments, validity may be assessed at the network level prior to a transmission of the primary content, and the validity of the identifier may be assumed by a client device receiving the transmission. In some embodiments, a trusted provider, cable operator, and/or content provider may provide a Domain Name System (DNS) allowing the identifier to be validated and/or authenticated. The DNS may be used to verify that the identifier is associated with a trusted and/or approved source. The DNS may be a secured DNS server, and may implement a DNS security protocol such as DNS-SEC. Additionally or alternatively, the DNS server may decrypt the identifier. In some embodiments, the identifier is validated and/or authenticated against a listing of known trusted and/or approved sources. The trusted provider may also provide the trusted token and/or security token. For example, the trusted token may be a security certificate issued by a higher level authority such as the content provider and/or a network component in a content distribution network.

Simplifying and securing the alternate links to supplemental content may have advantages in that the user is protected from other sites re-sourcing the content with links to non-trusted third party content and applications. Using tokens and authentication along with supplemental content links (e.g., URLs and/or URIs), a content provider can ensure a safe, secure, and simplified ecosystem for consumers of the content.

In some embodiments, the identifier may be provided to a client device upon a request for a program associated with the primary content. In other embodiments, the identifier may be available at the beginning of a discrete programming content item. For example, the identifier may be transmitted in a closed-caption layer as a first and/or subsequent caption at a beginning of a television program. In still other embodiments, the identifier may be repeatedly transmitted in association with the primary content such that it could be accessed even after an initial request for the program is handled. For example, the identifier may be transmitted as a separate elementary stream identified by a PID associated with a program containing the primary content. In other embodiments, the identifier may be retrieved in response to a user action such as a button press and/or other command from a remote control and/or other computing device. As one example, a double press of a "CC" (closed-captions) button may prompt retrieval of the identifier, if available.

At step 406, it may be determined whether the user accepts or intends to accept supplemental content. For example, user input may be received accepting the supplemental content. In some embodiments, the user may be prompted for a decision whether to accept supplemental content. In other embodiments, user preferences and/or settings determine whether to accept supplemental content. In still other embodiments, attributes of a gateway, display device, and/or other computing device in the network may be used to determine whether to accept supplemental content. In some embodiments, supplemental content may be accepted by default in step 406.

If at step 406 the determination is no, processing returns to step 402 where another identifier may be detected. Alternatively, processing may end and a user will not receive the supplemental content associated with the primary content. If at step 406 the determination is yes, the user has accepted the supplemental content and processing proceeds to step 408.

At step 408, supplemental content identifying data associated with the identifier may be retrieved. The supplemental content identifying data may indicate available supplemental content associated with the primary content. Where the identifier is a URI/URL, the identifier may be used as an address to retrieve the supplemental content identifying data. Where the identifier is a token, the identifier may be used to validate, authenticate, and/or lookup an address of the supplemental content identifying data, and/or the token may itself contain an address of the supplemental content identifying data. In some embodiments, the supplemental content identifying data may be located on the World Wide Web and/or internet, and may be accessible over external network 109 (FIG. 1). In other embodiments, the supplemental content identifying data may be located on storage local to either the premises 102 and/or the local office 103, and/or otherwise available on network 101. In some embodiments, the identifier may indicate that the supplemental content identifying data may be located in a portion of a transmission medium associated with the primary content. For example, the identifier may indicate that supplemental content for the primary content may be located on a separate stream identified by a different PID from a program containing the primary content. In some embodiments, the supplemental content identifying data may be provided by, for example, a content provider, cable operator, and/or other entity providing the transmission medium; in other embodiments, the supplemental content identifying data may be provided by a content creator and/or owner (discussed further below in regard to FIGS. 5 and 6).

The request to retrieve the supplemental content identifying data may include one or more parameters corresponding to attributes and/or preferences of the user, gateway, and/or display device. For example, the request may include one or more user attributes and preferences, such as account number, subscription level, service level, geographic location, language, age, gender, preferred content types, preferred content features, keywords, viewing history, browsing history, and the like. Further, the request may include one or more gateway attributes, such as model number, bandwidth available, status, connection health, SNR (signal-to-noise ratio), MAC address, IP address, operating system, user agent identifier, and the like. Further, the request may include one or more display device attributes, such as resolution, screen size, audio capabilities, video capabilities, 3D television support, 4 k television support, scanning support (interlaced, progressive, and the like), brand, applications available, refresh rates, display settings, and the like. Still further the request may provide information about a hardware and/or software configuration of one or more computing devices and/or display devices retrieving and presenting the supplemental content. In some embodiments, the parameters may indicate parental controls to be used in determining suitable supplemental content.

The supplemental content identifying data may indicate one or more supplemental content items associated with the primary content. For example, the supplemental content identifying data may be a metadata listing which includes a list of identifying information associated with one or more supplemental content items. In some embodiments, the supplemental content identifying data may include all supplemental content items associated with the primary content. In other embodiments, the supplemental content identifying data may include preferred supplemental content items and may provide an identifier of additional identifying data for other less preferred supplemental content items. In some embodiments, the supplemental content identifying data may include only those supplemental content items appropriate given parameters provided in a request for the supplemental content identifying data. For example, if parameters included in the request indicate that a television displaying the primary content does not support 3D television, the supplemental content identifying data provided in response may not include available supplemental content items that require 3D support. As another example, the supplemental content identifying data may include a subset of available supplemental content items deemed most appropriate and omit others, such as including a French audio track but omitting a German audio track where a user is identified as speaking French but not German.

As discussed above, the supplemental content identifying data may indicate an address of one or more supplemental content items associated with the primary content. In addition to providing a retrieval location of the supplemental content item, the supplemental content identifying data may also specify one or more display parameters for the supplemental content item. The supplemental content identifying data may identify a type for the supplemental content item, usable to identify the type of content provided. For example, the supplemental content item could be of type secondary audio and/or video, images, HTML content, social networking, and the like (as further discussed above). The type associated with the supplemental content item may be used to filter available supplemental content items either before their inclusion in the supplemental content identifying data and/or in presenting the supplemental content items to a user for selection. The supplemental content identifying data for the supplemental content item may provide suitable device and/or display attributes. For example, the supplemental content identifying data may indicate that a particular supplemental content item may be only viewable on TVs with 3D television support, or those that support 1080p resolution. As another example, the supplemental content identifying data may indicate that a particular supplemental content item is adapted for smartphones and/or game systems. The supplemental content identifying data may further specify various content attributes of the supplemental content item, such as resolution, size, duration, applications used, subscriptions, and the like. The supplemental content identifying data may further specify style attributes defining a display of the supplemental content item, similar to a style sheet. For example, the style attributes may specify display location, transparency, width, height, font, text size, color, background, and the like. Further, the supplemental content identifying data may include other parameters, such as a refresh rate for the supplemental content item, and/or an indication of an application to be launched to display and/or provided the supplemental content item.

At step 410, the user may select from available supplemental content. In some embodiments, this step may be optional. In other embodiments, this step may be performed in lieu of step 406. The user may be presented with a choice of available supplemental content options as indicated in the supplemental content identifying data. The presented supplemental content options may include a name, type, duration, size, cost, subscription requirement, and/or any other display attributes of the associated supplemental content item. Alternatively, the user may be asked whether he accepts supplemental content and appropriate supplemental content may be determined by the gateway and/or other device, which may be based on the supplemental content identifying data. In some embodiments, the gateway will automatically select appropriate supplemental content based on display parameters contained in the supplemental content identifying data. In other embodiments, a source of the supplemental content identifying data may have determined appropriate supplemental content as part of responding to a request for the supplemental content identifying data.

At step 412, supplemental content may be accessed according to the supplemental content identifying data. Step 412 may comprise accessing the supplemental content items that were selected in step 410. The supplemental content items may be accessed according to an address included in the supplemental content identifying data. In some embodiments, the supplemental content item may be located on the World Wide Web and/or internet, and may be accessible over external network 109 (FIG. 1). In other embodiments, the supplemental content item may be located on storage local to the premises 102 and/or the local office 103, and/or the supplemental content item may be otherwise available on network 101. In some embodiments, the address may indicate that the supplemental content item may be located in a portion of a transmission medium associated with the primary content. For example, the address may indicate that supplemental content item for the primary content may be located on a separate stream identified by a different PID from a program containing the primary content. In some embodiments, the supplemental content item may be provided by a content provider; in other embodiments, the supplemental content item may be provided by a content owner and/or creator (discussed further below in regard to FIGS. 5 and 6). In some embodiments, the supplemental content item may be provided by another entity authorized by the content provider and/or content creator.

In some embodiments, a request to access the supplemental content may include one or more parameters corresponding to attributes and/or preferences of the user, gateway, and/or display device, similar to the request for the supplemental content identifying data discussed above. For example, the request to access the supplemental content may include one or more user attributes and preferences, such as account number, subscription level, service level, geographic location, language, age, gender, preferred content types, preferred content features, keywords, viewing history, browsing history, and the like. Further, the request may include one or more gateway attributes, such as model number, bandwidth available, status, connection health, SNR (signal-to-noise ratio), MAC address, IP address, operating system, user agent identifier, and the like. Further, the request may include one or more display device attributes, such as resolution, screen size, audio capabilities, video capabilities, 3D television support, 4 k television support, scanning support (interlaced, progressive, and the like), brand, applications available, refresh rates, display settings, and the like. Still further the request may provide information about a hardware and/or software configuration of one or more computing devices and/or display devices retrieving and presenting the supplemental content.

For example, if returned supplemental content identifying data indicates that secondary video was available, a request for the secondary video may, in some embodiments, include information identifying display capabilities of a display device, such as that it supports 1080p resolution content. As a result, in some embodiments the supplemental content identifying data need not provide a different address for each variation of a supplemental content item.

At step 414, a display of the supplemental content in conjunction with the primary content may be generated and/or provided to a display device. The display may be generated according to display parameters provided in the supplemental content identifying data, such as a metadata listing, and/or by other display parameters contained in the supplemental content. Additionally or alternatively, the display may be generated according to a user selection and/or preference, such as where the user has specified that the selected supplemental content should be display on a left side of the screen. The selected supplemental content items may be displayed on the same display device as the associated primary content, providing a combined display of the supplemental and primary content, and/or on a separate device. The supplemental content items may be displayed alongside of the associated primary content, and/or the supplemental content items may be incorporated within a display of the primary content. In some embodiments, supplemental content may replace portions of the associated primary content. The primary content may be scaled down and/or otherwise resized to provide space in which supplemental content can be presented. Additionally or alternatively, supplemental content may be displayed super-imposed and/or otherwise combined with the primary content. Further, supplemental content may replace one or more portions of the primary content.

The display of the supplemental content and the primary content may be synchronized such that portions of the supplemental content corresponding to portions of the primary content are displayed concurrently. A display of the supplemental content may begin at substantially the same time as the primary content, once the supplemental content has been retrieved. Playback of the supplemental content may be advanced, rewound, and/or paused in order to remain in synchronization with the primary content. Display of a particular supplemental content item may be paused and/or suppressed while another supplemental content item may be displayed. For example, fun facts about a primary content movie may be temporarily hidden during an advertisement taking place during the movie, and additional supplemental content may be displayed during the advertisement. Display of a supplemental content item may end when display of associated primary content ends, and/or display of a supplemental content item may end after a user has had a predetermined amount of time to view the display.

In some embodiments, the process described above and illustrated in FIG. 4 may be adapted to be performed in a Digital Video Recorder (DVR) associated with gateway 111. A DVR may be used to record a primary video content item provided over the network 101. In some embodiments, a user may be prompted whether to record supplemental content associated with a primary content item selected for recording. Responsive to selecting the primary content item for recording, the system may retrieve an identifier of supplemental content identifying data, such as a metadata listing, providing supplemental content associated with the primary content item. If it is determined that supplemental content should be recorded, the supplemental content identifying data may be used to retrieve supplemental content as appropriate according to the techniques described above.

As a result of the process illustrated in FIG. 4, a user may be provided with a display of supplemental content associated with a primary content item. The process may be extensible and may accommodate a wide range of available supplemental content items and user preferences. Having discussed an illustrative example of a method according to one or more embodiments, discussion will now turn to an example system for retrieving supplemental content as illustrated in FIG. 5.

Figure 5:
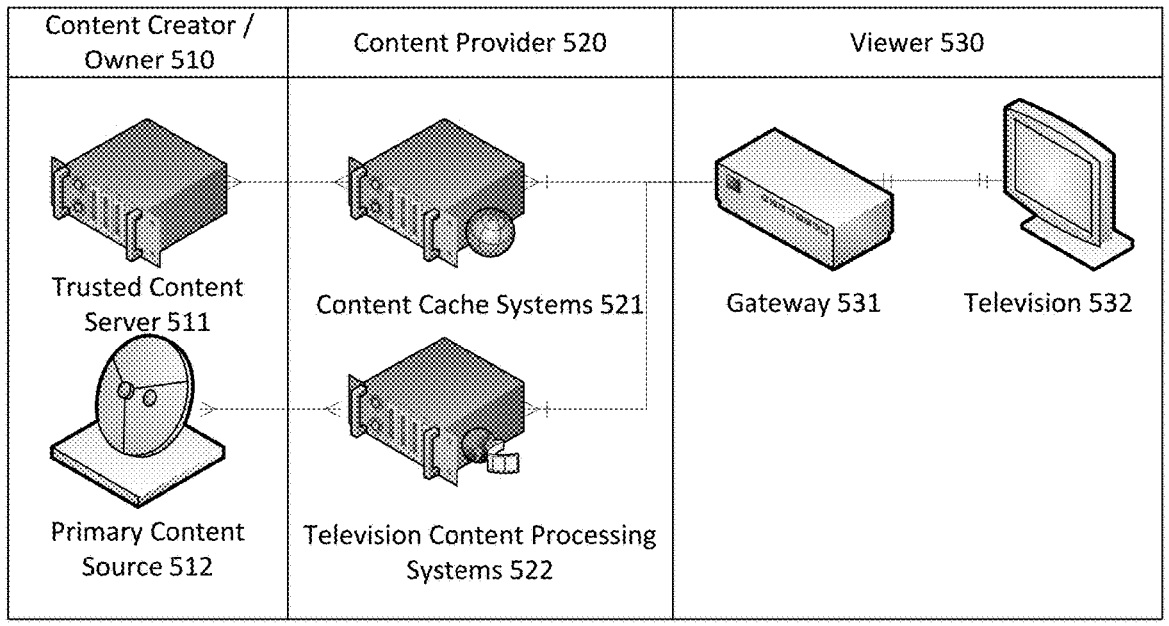
FIG. 5 illustrates an example system for implementing various features described herein.

FIG. 5 illustrates an example system 500 and relationships between constituent devices implemented according to one or more embodiments. System 500 may be configured to or operable to provide viewer 530 with a display of supplemental content related to a primary content item. System 500 may include content creator and/or owner 510, content provider 520, and viewer 530. In some embodiments, content owner 510 and content provider 520 may be the same or related entities, and in other embodiments they may be distinct entities.

Content owner 510 may include one or more primary content sources 512. Primary content source 512 provides content to one or more television content processing systems 522 of content provider 520 for transmission and distribution to viewer 530. For example, a content owner 510 associated with primary content source 512 may be a television network and/or other producer of video content and content provider 520 may be a cable operator that provides content to viewer 530. Content provided by content owner 510 to content provider 520 may be transmitted through use of television content processing systems 522 and may be received by viewer 530 at gateway 531. A transmission medium received by gateway 531 may be parsed and/or otherwise processed to generate a display of a desired video content item on television 532. As discussed above, in some embodiments the transmission medium may be a MPEG Transport Stream, and the transmission medium may be transmitted according to one or more standards for television broadcast, such as ATSC and/or DVB. In some embodiments, the desired video content may be a program included in the transport stream and may be identified in a suitable location such as a PAT listing one or more program maps. The program maps may list the PIDs associated with a particular program. Video content may be identified according to a PID associated with elementary streams containing portions of the desired video content.

According to some embodiments, an identifier of supplemental content identifying data associated with supplemental content for the desired video content may be provided. In some embodiments, the identifier may be provided as part of a content transport stream. The identifier may be included in supplemental information of a PAT included in the transport stream. Additionally and/or alternatively, the identifier may be included in a program map identified by the PAT. In some embodiments, the identifier may be included on one or more elementary streams containing the desired video content. In others, the identifier may be included on one or more elementary streams associated with the desired video content and identified in the program map. In still other embodiments, the identifier may be included in a portion of the transmission medium used to transmit closed-caption data. In one embodiment, the identifier may be encoded in an elementary stream used to transmit closed-caption data according to the EIA-708 and/or CEA-708 standards. In another embodiment, the identifier may be included in a line of VBI data associated with the video content, such as line-21 according to the EIA-608 standard.

The identifier may be inserted into a transmission medium associated with the desired video content. The identifier may be generated, provided, and/or insert by any of the content owner 510, content provider 520, and/or by a third party (not shown). For example, the identifier may be included as part of the transport packets for a MPEG stream and/or included in a separate stream and time stamped to operate at certain times. In other embodiments, any appropriate transmission medium and protocol may be used to provide content items to viewer 430.

Content owner 510 may include one or more trusted content servers 511 which may provide supplemental content identifying data and supplemental content associated with the primary video content provided by primary content source 512. Alternatively, a trusted content server 511 associated with a different content source other than the content owner 510 associated with primary content source 512 may provide the supplemental content identifying data and supplemental content. The supplemental content identifying data and supplemental content may be provided to one or more content cache systems 521 of the content provider 520. Caching the supplemental content may improve speed in handling requests for the supplemental content and may reduce the number of requests made to external servers such as trusted content server 511. In some embodiments, the supplemental content identifying data and/or supplemental content may not be cached and may be provided directly from trusted content server 511. The supplemental content identifying data and supplemental content may be addressable using a URI or URL, and/or it may be addressable using some other technique. For example, a name and/or key associated with the particular supplemental content item may be used to retrieve the supplemental content. In some embodiments, the content cache systems 521 may store the supplemental content identifying data while the trusted content servers 511 may store the supplemental content.

Supplemental content associated with primary video content may be received by gateway 531 and used to generate a display of the primary video content with the associated supplemental content for output to television 532 and/or other display device.

In some embodiments, television content processing systems 522 may include a content processing device configured to provide an identifier of the supplemental content identifying data. Similarly, content cache systems 521 may include a metadata server device configured to provide the supplemental content identifying data, and may further provide the supplemental content.

Although trusted content server 511, primary content source 512, content cache systems 521, television content processing systems 522, gateway 531, and television 532 are illustrated in FIG. 5 as belonging respectively to content owner 510, content provider 520, and viewer 530, it should be understood that any of the illustrated components may be operated by, located at, owned by, and/or otherwise controlled by any of the illustrated entities without departing from this disclosure.

Figure 6:
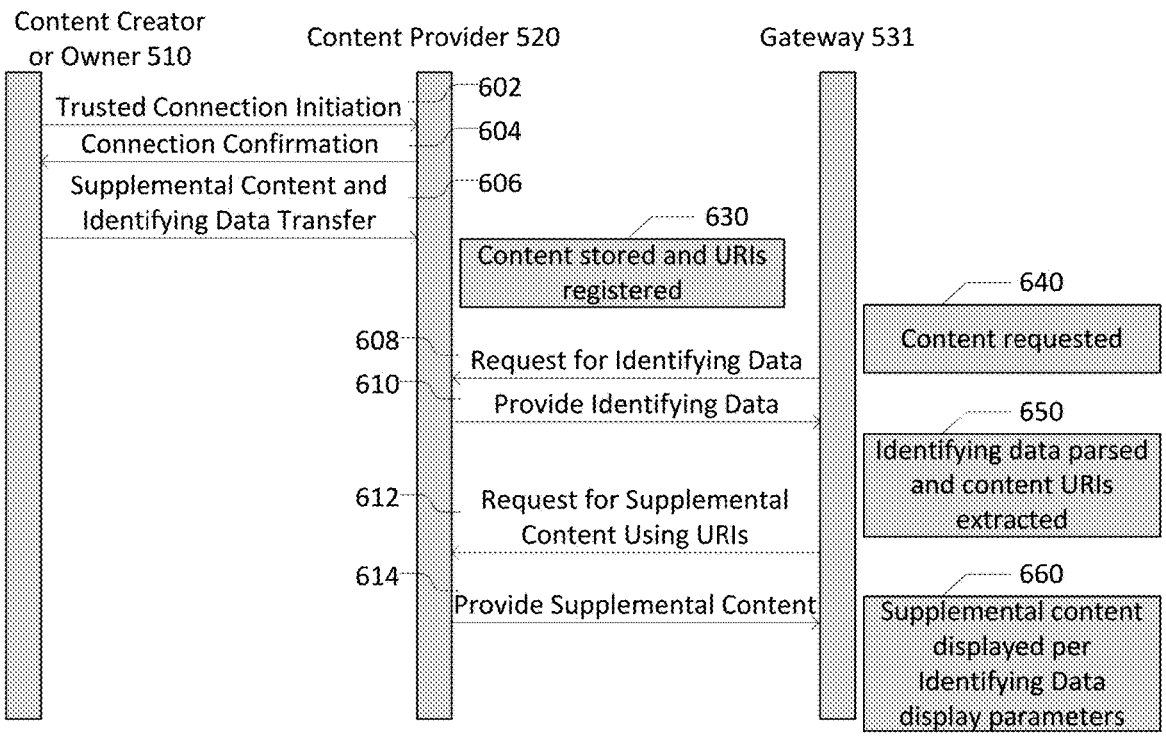
FIG. 6 illustrates an example process flow for implementing various features described herein.

Having described an example system 500 according to some embodiments, an example process flow as illustrated in FIG. 6 will be described. The process flow illustrated in FIG. 6 may be implemented in system 500, and/or in other suitable systems.

As a provisioning step, content creator or owner 510 may transfer supplemental content and supplemental content identifying data files, such as metadata files, to content provider 520, which may be a cable operator that provides content to view 530. At step 602, content owner 510 initiates a trusted connection with content provider 520. At step 604, content provider 520 confirms the trusted connection. At step 606, content owner 510 may transfer supplemental content and supplemental content identifying data files, such as metadata files, to content provider 520. As a result, at state 630 supplemental content may be stored at content provider 520 and associated URIs are registered.

At state 640, gateway 531 may access a particular primary content item. For example, gateway 531 may tune into a particular channel. Responsive to accessing the particular primary content item, gateway 531 may receive an identifier associated with supplemental content identifying data. The identifier may indicate the availability of supplemental content associated with the primary video content. The identifier may indicate available supplemental content identifying data, such as a metadata listing, associated with the primary video content. The supplemental content identifying data may provide display parameters for supplemental content associated with the primary content, as discussed further below. In some embodiments, the identifier may be a URI or URL providing an address of the supplemental content identifying data. In other embodiments, the identifier may comprise a token recognizable as indicating available supplemental content identifying data. The identifier may be detected by parsing an appropriate portion of a transmission medium associated with the primary content.

As part of receiving the identifier, gateway 531 may determine whether the identifier is valid and/or authenticated. The identifier may be checked against an expected syntax, such as a proper format for a URI. In some embodiments, the identifier may be at least partially encrypted and/or compressed. The identifier may be authenticated through a trusted third party, and/or the identifier may comprise a trusted token and/or security token issued by a known authority. Additionally and/or alternatively, a signed security certificate may be used to authenticate the identifier. In some embodiments, the identifier may be deemed valid due to a known security level of the transmission medium and/or a user security setting. For example, in some embodiments system 500 may be designed such that only authorized parties such as content creator or owner 510 and content provider 520 are able to insert the identifier. In some embodiments, validity may be assessed at the network level prior to a transmission of the primary content, and the validity of the identifier may be assumed by a client device receiving the transmission.

After gateway 531 receives and/or validates the identifier, at step 608 gateway 531 may request the supplemental content identifying data identified by the identifier from the content provider 520. The supplemental content identifying data may be retrieved from content cache system 521 and/or trusted content server 511. A request to retrieve the supplemental content identifying data may include one or more parameters corresponding to user, device, and/or network attributes and preferences as discussed above in regard to FIG. 4. At step 610, the content owner 510 and/or content provider 520 may provide a pre-stored supplemental content identifying data and/or may determine appropriate or available supplemental content items to include in the supplemental content identifying data based on parameters included in the request and/or other information known about the requesting gateway 531 and/or a user.

Having received the supplemental content identifying data, at state 650 gateway 531 may parse the supplemental content identifying data to extract URIs and/or other identifiers of supplemental content included in the supplemental content identifying data. Gateway 531 may determine whether to display supplemental content. Gateway 531 may prompt a user whether to display supplemental content. Gateway 531 may provide the user with an indication of the type and identity of available supplemental content, as discussed above in regard to FIG. 4. In some embodiments, the supplemental content identifying data may include more than one supplemental content item, and the user may make a selection from among the included supplemental content items. Additionally or alternatively, gateway 531 may make a determination whether to display supplemental content based on device, user, and/or network parameters and preferences.

At step 612 gateway 531 may request all or a portion of the supplemental content indicated by the supplemental content identifying data using the URIs and/or other identifiers contained therein. The request for the supplemental content may contain parameters corresponding to user, device, and/or network attributes and preferences as described above in regard to FIG. 4. Content provider 520 may determine appropriate supplemental content items to provide in response to the request based on URIs contained in the requests and/or other parameters. At step 614 content provider 520 provides and/or streams supplemental content to gateway 531. For example, content provider 520 may transmit data corresponding to the supplemental content in a transmission medium. In some embodiments, the transmission medium may be a broadcast medium. In other embodiments, any suitable transmission medium may be used to provide the supplemental content to viewer 530. The supplemental content may be received by gateway 531 and may be used to generate a display of the supplemental content according to display parameters included in the supplemental content identifying data at state 660.

Figure 7:
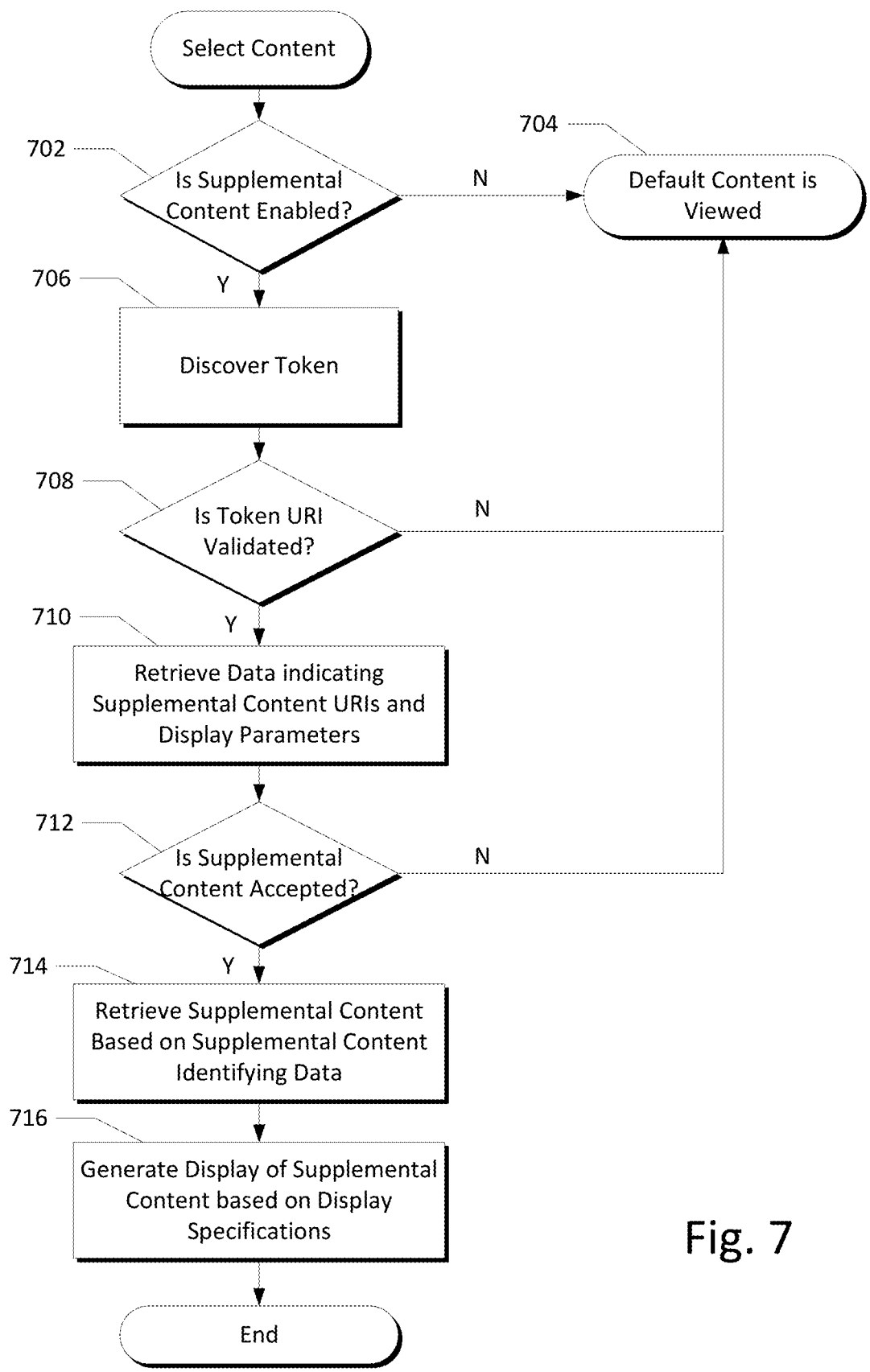
FIG. 7 illustrates another example method for implementing various features described herein.

Having described an example process flow as illustrated in FIG. 6, discussion will now turn to a method according to one or more embodiments as illustrated in FIG. 7.

FIG. 7 illustrates an example method performed in a content distribution environment responsive to a viewer selecting primary content for retrieval through a computing device such as a set-top box 113 and/or gateway 111. Responsive to the viewer selecting the primary content, the computing device such as set-top box 113 or gateway 111 may retrieve the primary content. For example, a user may select content by selecting a channel associated with the primary content, and in response a program associated with that channel may be retrieved.

In step 702, a check may be made as to whether supplemental content is enabled on the computing device. If the result is no, processing proceeds to step 704 and default primary content may be viewed. If instead the result is yes, processing proceeds to step 706.

At step 706, the computing device may discover a token identifying supplemental content identifying data indicating supplemental content associated with the program. As described above, the token may be a URI/URL corresponding to the supplemental content identifying data, or may otherwise identify the supplemental content identifying data.

At step 708 it may be determined whether a URI contained in the token is valid or authenticated. If the result is no, processing proceeds to step 704 and the primary content may be viewed. If instead the result is yes, processing proceeds to step 710.

At step 710, the computing device may retrieve supplemental content identifying data defining supplemental content URIs and display parameters. As described above in regard to FIG. 4, the supplemental content identifying data may indicate one or more available supplemental content items, and a request for the supplemental content identifying data may include parameters corresponding to user, device, or network attributes and preferences.

At step 712 it may be determined whether supplemental content is accepted. A user may be prompted whether the computing device, such as gateway 111, should retrieve supplemental content, or the computing device may otherwise determine to retrieve the supplemental content. If the result is no, processing proceeds to step 704 and default primary content may be viewed. If instead the result is yes, processing proceeds to step 714.

At step 714, the computing device may retrieve supplemental content based on the URIs and parameters contained in the supplemental content identifying data. In some embodiments discussed above in regard to FIG. 4, a request for the supplemental content may identify one or more parameters corresponding to user, device, or network attributes and preferences.

At step 716, the computing device may generate a display of the supplemental content based on display specifications contained in the supplemental content identifying data for output to a display device. As discussed above, the generated display may combine the supplemental content with the primary content. After step 716, supplemental content may be included in a display for output to the display device until the primary content ends, a program associated with the primary content ends, the supplemental content ends, and/or the user discontinues display of supplemental content. Further, supplemental content included on the generated display may be replaced by other supplemental content responsive to receiving additional supplemental content identifying data or token and/or due to a change in the primary content.

As a result of the FIG. 7 process, a viewer of a transmitted content item may be provided with supplemental content enhancing the viewer's experience. The method illustrated, for example, in FIG. 7 may be flexible and extensible such that a wide range of supplemental content may be provided. Furthermore, the transmission of the identifier associated with the supplemental content identifying data according to some embodiments may be unobtrusive so as the not interfere with users who are unable to view and/or do not desire supplemental content.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

I claim:

1. A method comprising:
receiving, by a first computing device, a plurality of different streams, wherein the plurality of different streams comprise:
a video data stream comprising a primary content item, and
a closed-captioning data stream comprising an identifier indicating that one or more supplemental content items associated with the primary content item are available;
determining, by the first computing device and based on determining whether the one or more available supplemental content items are compatible with one or more attributes of a display device associated with the first computing device, a subset of the one or more available supplemental content items;
causing, by the first computing device, the display device to output the primary content item and data indicating the subset of the one or more available supplemental content items; and
causing, by the first computing device and based on a selection of one or more supplemental content items of the subset, the display device to output the selected one or more supplemental content items.

2. The method of claim 1, further comprising receiving one or more parameters for each of the one or more available supplemental content items,
wherein the one or more parameters for each available supplemental content item comprise:
an address of that available supplemental content item;
a content type associated with that available supplemental content item;
one or more display device attributes;
one or more style attributes defining a display of that available supplemental content item; or
one or more content attributes associated with that available supplemental content item.

3. A method comprising:
receiving by a computing device, a plurality of different streams, wherein the plurality of different streams comprise:
a video data stream comprising a primary content item; and
a closed-captioning data stream comprising an identifier indicating that a plurality of supplemental content items associated with the primary content item are available;
retrieving the identifier from the closed-captioning data stream based on receiving a user input from an input device associated with the computing device; and
causing, by the computing device and based on determining the plurality of supplemental content items, output, via a display device associated with the computing device, of the primary content item and data indicating the plurality of supplemental content items.

4. The method of claim 3, further comprising:
causing, based on receiving a selection of one or more of the plurality of supplemental content items, output, via the display device, of the primary content item and the selected one or more supplemental content items, by replacing a portion of the primary content item with the selected one or more supplemental content items.

5. A method comprising:
receiving by a computing device, a plurality of different streams, wherein the plurality of different streams comprise:
a video data stream comprising primary content, and
a closed-captioning data stream comprising a token;
decoding, by the computing device, the token to determine a uniform resource identifier ("URI") associated with one or more supplemental content items associated with the primary content and to determine one or more display parameters for each supplemental content item of the one or more supplemental content items;

causing, by the computing device, output, via a display device, of the primary content overlaid with data indicating the one or more supplemental content items;

based on a user selection of one or more of the one or more supplemental content items, determining a selected one or more supplemental content items; and causing, by the computing device, output, via the display device, of the primary content alongside the selected one or more supplemental content items according to the display parameters of the selected one or more supplemental content items.

6. The method of claim 5, wherein the URI is based on a security certificate.

7. The method of claim 1, wherein the selected one or more supplemental content items comprise at least a chat environment, and wherein the output of the selected one or more supplemental content items comprises a synchronized output of the primary content item with the chat environment.

8. The method of claim 1, further comprising:
causing the display device to terminate display of the selected one or more supplemental content items based on a display end time of the primary content item.

9. The method of claim 1, further comprising receiving one or more display parameters for each of the one or more available supplemental content items, and wherein a location, a transparency, and a size of the selected one or more supplemental content items output via the display device are determined based on the one or more display parameters for the selected one or more supplemental content items.

10. The method of claim 3, further comprising:
causing, based on receiving a selection of one or more of the plurality of supplemental content items, output, via the display device, of the primary content item and the selected one or more supplemental content items, and receiving, for each supplemental content item, one or more display parameters, wherein a location, a transparency, and a size of the selected one or more supplemental content items output via the display device are determined based on the one or more display parameters of the selected one or more supplemental content items.

11. The method of claim 5, wherein a location, a transparency, and a size of the selected one or more supplemental content items are determined based on the display parameters for the selected one or more supplemental content items.

12. The method of claim 1, wherein receiving the video data stream and the closed-captioning data stream comprise different Moving Pictures Expert Group (MPEG) elementary streams.

13. The method of claim 1, wherein the identifier is transmitted in an initial caption of the closed-captioning data stream.

14. The method of claim 1, further comprising outputting, to the display device, the video data stream without outputting the closed-captioning data stream.

15. The method of claim 1, further comprising detecting the identifier in the closed-captioning data stream by:
after receiving a user input from an input device, parsing the closed-captioning data stream for an identifier having a predetermined syntax.

16. The method of claim 3, wherein the identifier is retrieved from the closed-captioning data stream based on receiving a double press of a closed-captioning button on the input device.

17. The method of claim 3, further comprising:
receiving the video data stream and the closed-captioning data stream via a first transmission; and
receiving one or more parameters for each supplemental content item of the plurality of supplemental content items,
wherein the one or more parameters for each supplemental content item comprise an address of that supplemental content item indicating that the supplemental content item is located in another data stream, of the first transmission, different from the video data stream and the closed-captioning data stream.

18. The method of claim 1, further comprising:
receiving a program map table identifying data streams associated with the primary content item; and
determining, based on using the program map table to identify the closed-captioning data stream, the identifier.

19. The method of claim 1, wherein the output of the data indicating the subset of the one or more available supplemental content items comprises for each supplemental content item in the subset, a size, a cost, and a subscription requirement of that supplemental content item.

20. The method of claim 3, further comprising:
causing output, via the display device, of the primary content item and a selected supplemental content item of the plurality of supplemental content items; and
based on detecting output of an advertisement from the primary content item, hiding a display of the selected supplemental content item.

21. The method of claim 5, further comprising:
receiving, by the computing device, information identifying a domain name system (DNS) server for verifying that the URI is associated with an approved source; and
after decoding the token to determine the URI, authenticating the determined URI by using the DNS server.

22. The method of claim 5, further comprising authenticating the URI based on a security setting of a user associated with the computing device.

23. The method of claim 5, further comprising:
authenticating the token based on determining a security level of a transmission comprising the video data stream and the closed-captioning data stream, wherein the decoding is based on determining, by the authenticating, that the token is valid.

24. The method of claim 1, wherein the closed-captioning data stream transmits the identifier in accordance with a Consumer Electronics Association (CEA)-708 standard.

25. The method of claim 1, wherein the one or more attributes of the display device comprise one or more of the following: a resolution, a screen size, audio capability, video capability, 3D television support, 4 k television support, scanning support, brand name, applications available, and refresh rates.

26. The method of claim 1, wherein the identifier is time-stamped, and
wherein the method further comprises causing a supplemental content item identified by the identifier to be output at a time corresponding to the time-stamped identifier.

27. The method of claim 1, further comprising
causing, based on receiving a double press of a closed-captioning button on an input device associated with the first computing device, output, via the display device, of data indicating the one or more supplemental content items identified by the identifier.

28. The method of claim 3, further comprising:
determining, from the plurality of supplemental content items, one or more supplemental content items that are incompatible with one or more attributes of the display device; and
omitting, from the data indicating the plurality of supplemental content items, the one or more supplemental content items that are incompatible with the one or more attributes of the display device.

29. The method of claim 5, further comprising:
determining the data indicating the one or more supplemental content items based on determining that the one or more supplemental content items are compatible with one or more attributes of the display device.

* * * * *

UNITED STATES PATENT AND TRADEMARK OFFICE
CERTIFICATE OF CORRECTION

PATENT NO. : 11,076,205 B2
APPLICATION NO. : 14/200508
DATED : July 27, 2021
INVENTOR(S) : Walker It is certified that error appears in the above-identified patent and that said Letters Patent is hereby corrected as shown below:

In the Specification

Column 10, Detailed Description, Line 31:
Delete "101," and insert --100,-- therefor Column 10, Detailed Description, Line 65:
Delete "101" and insert --100-- therefor Column 11, Detailed Description, Line 5:
Delete "101," and insert --100,-- therefor Column 11, Detailed Description, Line 19:
Delete "'ND'" and insert --'PID'-- therefor Column 13, Detailed Description, Line 30:
Delete "101." and insert --100.-- therefor Column 13, Detailed Description, Line 59:
Delete "4 k" and insert --4k-- therefor Column 15, Detailed Description, Line 30:
Delete "101." and insert --100.-- therefor Column 15, Detailed Description, Line 61:
Delete "4 k" and insert --4k-- therefor Column 16, Detailed Description, Line 59:
Delete "101." and insert --100.-- therefor Signed and Sealed this
Eleventh Day of April, 2023

Katherine Kelly Vidal
*Director of the United States Patent and Trademark Office*

CERTIFICATE OF CORRECTION (continued)
U.S. Pat. No. 11,076,205 B2

Column 18, Detailed Description, Line 12:
Delete "430." and insert --530.-- therefor Column 19, Detailed Description, Line 2:
Delete "view" and insert --viewer-- therefor In the Claims Column 22, Line 34:
In Claim 3, after "receiving", insert --,--

Column 22, Line 59:
In Claim 5, after "receiving", insert --,--

Column 23, Line 53:
In Claim 12, after "wherein", delete "receiving"

Column 24, Line 26:
In Claim 19, after "comprises", insert --,--

Column 24, Line 59:
In Claim 25, delete "4 k" and insert --4k-- therefor

Column 25, Line 1:
In Claim 27, after "comprising", insert --:--